United States Patent
McCullough et al.

(10) Patent No.: US 10,736,051 B2
(45) Date of Patent: Aug. 4, 2020

(54) VARIABLE POWER CONTROL IN A WIRELESS NETWORK

(71) Applicant: CHARTER COMMUNICATIONS OPERATING, LLC, Saint Louis, MO (US)

(72) Inventors: Taren G. McCullough, Denver, CO (US); Matthew J. Dillon, Greenwood Village, CO (US); Christopher W. Watson, Highlands Ranch, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 16/133,348

(22) Filed: Sep. 17, 2018

(65) Prior Publication Data
US 2020/0092825 A1    Mar. 19, 2020

(51) Int. Cl.
*H04W 52/24* (2009.01)
*H04B 17/24* (2015.01)
*H04W 52/50* (2009.01)
*H04B 17/10* (2015.01)

(52) U.S. Cl.
CPC ........ *H04W 52/243* (2013.01); *H04B 17/102* (2015.01); *H04B 17/24* (2015.01); *H04W 52/241* (2013.01); *H04W 52/50* (2013.01)

(58) Field of Classification Search
CPC .. H04B 17/0085; H04B 17/102; H04B 17/24; H04B 17/29; H04W 24/06; H04W 24/10; H04W 52/20; H04W 52/241; H04W 52/243; H04W 52/386; H04W 52/50; H04W 52/262; H04W 52/343; H04W 52/367; H04W 52/42; H04W 72/0426; H04W 72/082; H04W 84/12; H04W 88/18
USPC ........................................................ 455/522
See application file for complete search history.

(56) References Cited

U.S. PATENT DOCUMENTS

| | | | |
|---|---|---|---|
| 2009/0185518 A1* | 7/2009 | Viswanath | H04W 52/245 370/311 |
| 2010/0087221 A1* | 4/2010 | Srinivasan | H04W 16/08 455/522 |
| 2011/0223950 A1* | 9/2011 | Shibuya | H04W 52/265 455/501 |

(Continued)

*Primary Examiner* — Yuwen Pan
*Assistant Examiner* — Paul P Tran
(74) *Attorney, Agent, or Firm* — Armis IP Law, LLC

(57) ABSTRACT

To reduce wireless interference (noise) in a network environment, a management resource communicates a notification to multiple wireless access points. The notification indicates a wireless power transmit test to be performed with respect to the primary wireless access point in a vicinity of the multiple wireless access points. In accordance with the wireless power transmit test, the primary wireless access point transmits multiple test communications at different wireless power levels from the primary wireless access point to the multiple wireless access points. The multiple wireless access points generate feedback based on their ability to receive the test communications. The feedback indicates wireless power levels at which the multiple wireless access points receive the test communications at different power levels from the primary wireless access point. Based on feedback, a controller adjusts its transmit power level of the primary wireless access point to reduce its interference with other wireless access points.

35 Claims, 14 Drawing Sheets

1300

- COMMUNICATE A NOTIFICATION TO MULTIPLE WIRELESS ACCESS POINTS IN A NETWORK ENVIRONMENT, THE NOTIFICATION INDICATING A WIRELESS POWER TRANSMIT TEST ASSOCIATED WITH A PRIMARY WIRELESS ACCESS POINT — 1310

- IN ACCORDANCE WITH THE WIRELESS POWER TRANSMIT TEST, TRANSMITTING MULTIPLE TEST COMMUNICATIONS AT DIFFERENT WIRELESS POWER LEVELS FROM THE PRIMARY WIRELESS ACCESS POINT TO THE MULTIPLE WIRELESS ACCESS POINTS — 1320

- ADJUST A TRANSMIT POWER LEVEL OF THE PRIMARY WIRELESS ACCESS POINT BASED ON FEEDBACK GENERATED BY THE MULTIPLE WIRELESS ACCESS POINTS — 1330

(56) References Cited

U.S. PATENT DOCUMENTS

| | | | | |
|---|---|---|---|---|
| 2013/0150068 A1* | 6/2013 | Hui | ............... | H04W 48/10 |
| | | | | 455/452.2 |
| 2014/0036715 A1* | 2/2014 | Chung | ............... | H04W 24/06 |
| | | | | 370/252 |
| 2014/0314003 A1* | 10/2014 | Zhou | ............... | H04W 40/246 |
| | | | | 370/329 |
| 2016/0165549 A1* | 6/2016 | Zhang | ............... | H04W 52/243 |
| | | | | 370/329 |
| 2016/0165555 A1* | 6/2016 | Jeong | ............... | H04W 52/245 |
| | | | | 455/447 |
| 2016/0381645 A1* | 12/2016 | Shanks | ............... | H04W 24/10 |
| | | | | 370/338 |
| 2017/0111919 A1* | 4/2017 | Madan | ............... | H04W 72/1273 |

\* cited by examiner

COMMUNICATIONS
320

WAP UNDER TEST = WAP 121 (SSID#1)

STARTING TRANSMIT PWR LEVEL = 90

TIME FOR EACH TEST INTERVALS = 20mS

NUMBER OF INTERVALS = 30

PWR STEP = -3

| COMMUNICATIONS 340 |
|---|
| REPORTING WAP = WAP 122 (SSID#2) |
| TRANSMITTING WAP = WAP 121 |
| REC SIG PWR (TEST PACKET #1) = 60 |
| REC SIG PWR (TEST PACKET #2) = 57 |
| ... |
| REC SIG PWR (TEST PACKET #18) = 3 |
| REC SIG PWR (TEST PACKET #19) = 0 |
| REC SIG PWR (TEST PACKET #20) = 0 |
| ... |

| COMMUNICATIONS 350 |
|---|
| REPORTING WAP = WAP 123 (SSID#3) |
| TRANSMITTING WAP = WAP 121 |
| REC SIG PWR (TEST PACKET #1) = 70 |
| REC SIG PWR (TEST PACKET #2) = 67 |
| ... |
| REC SIG PWR (TEST PACKET #23) = 3 |
| REC SIG PWR (TEST PACKET #24) = 0 |
| REC SIG PWR (TEST PACKET #25) = 0 |
| ... |

| COMMUNICATIONS 360 |
|---|
| REPORTING WAP = WAP 124 (SSID#4) |
| TRANSMITTING WAP = WAP 121 |
| REC SIG PWR (TEST PACKET #1) = 20 |
| REC SIG PWR (TEST PACKET #2) = 17 |
| REC SIG PWR (TEST PACKET #3) = 14 |
| REC SIG PWR (TEST PACKET #4) = 11 |
| REC SIG PWR (TEST PACKET #5) = 8 |
| REC SIG PWR (TEST PACKET #6) = 5 |
| REC SIG PWR (TEST PACKET #7) = 2 |
| REC SIG PWR (TEST PACKET #8) = 0 |
| REC SIG PWR (TEST PACKET #9) = 0 |
| REC SIG PWR (TEST PACKET #105) = 0 |
| ... |

FIG. 7

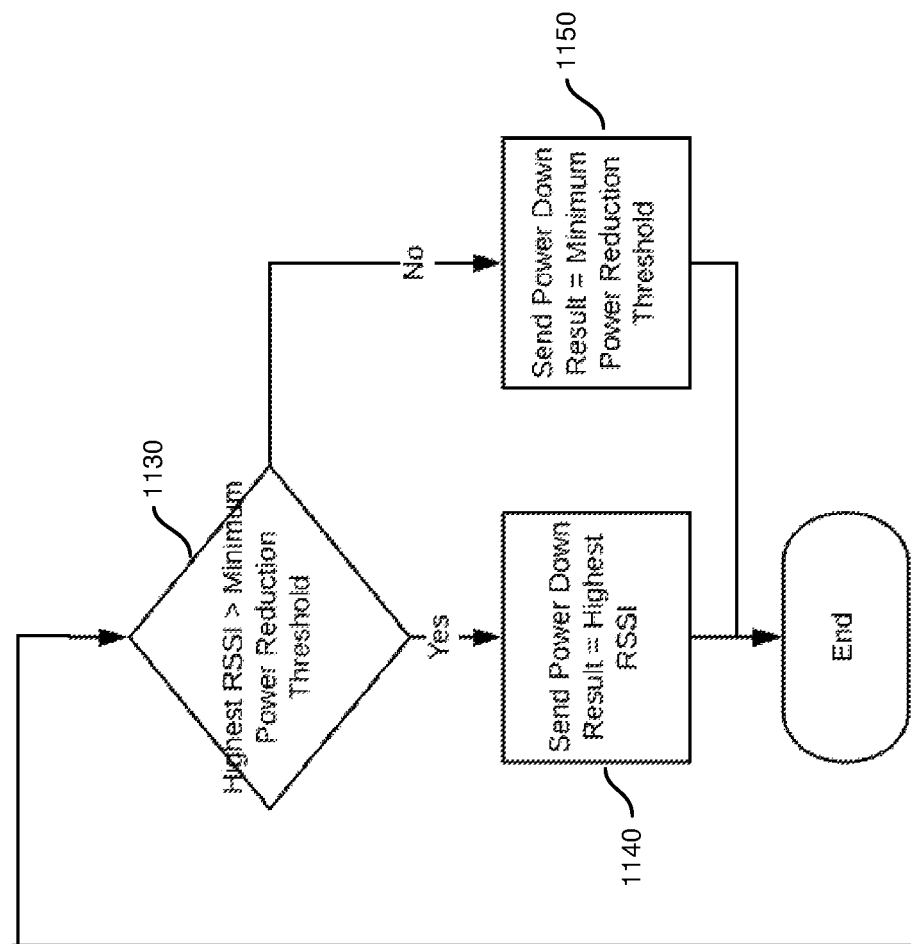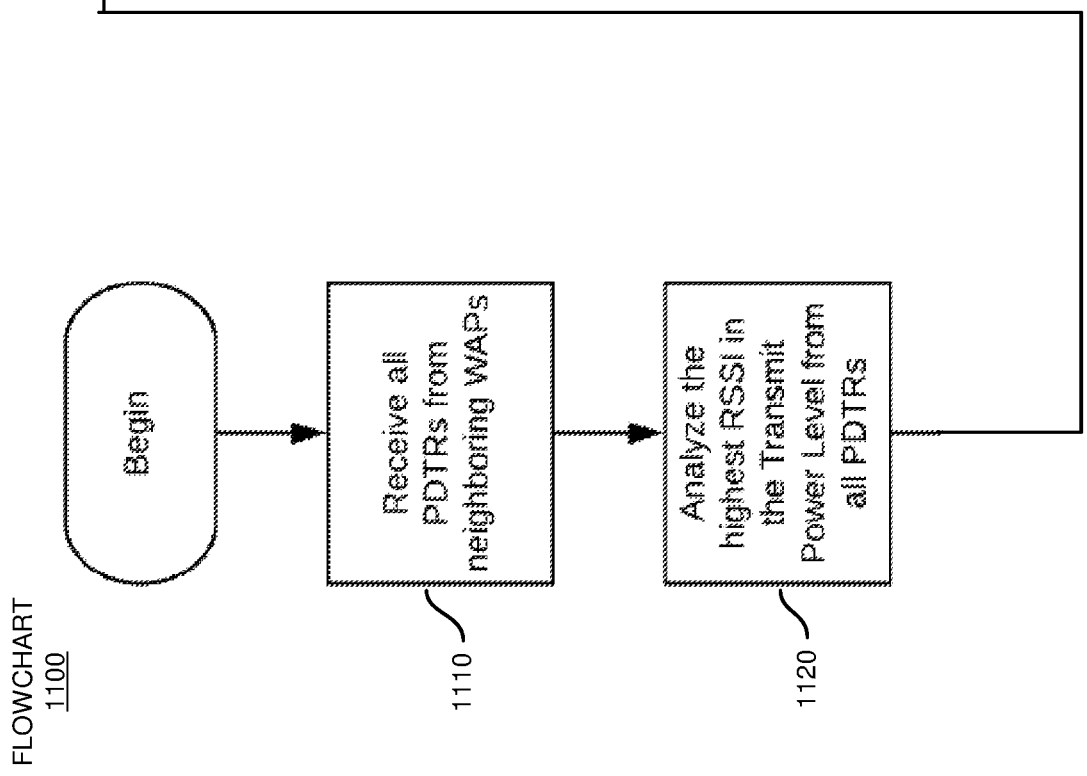
FIG. 11

VARIABLE POWER CONTROL IN A WIRELESS NETWORK

BACKGROUND

The IEEE standard 802.11h specifies different wireless power output levels for different network environments. For example, the standard specifies a first wireless power transmit level (such as 200 milliwatts) for indoor wireless channels; the standard specifies a second wireless power transmit level (such as 1000 milliwatts) for DFS (Dynamic Frequency Selection) channels; the standard specifies a third wireless power transmit level (such as 4000 milliwatts) for outdoor wireless channels.

In general, conventional wireless networks typically include one or more wireless base stations (or wireless access points) that transmit at maximum power levels specified by 802.11 to provide mobile communication devices access to a remote network such as the Internet. Transmitting at highest available levels ensures that respective communication devices are able to receive wireless communications at a desired level of quality.

BRIEF DESCRIPTION OF EMBODIMENTS

There are deficiencies associated with conventional techniques of providing wireless connectivity according to conventional techniques. For example, transmitting at a highest possible power level results in lower signal to noise ratios (SNR) for other wireless stations communicating in a shared network environment. Thus, when a wireless access point needlessly transmits at a highest possible output level, it potentially results in a high level of noise that interferes with or is intrusive to neighboring wireless stations.

Embodiments herein include the observation that wirelessly communicating (from wireless stations such as base stations, wireless access points, mobile communication devices, etc.) at unnecessarily high transmit levels reduces an efficient use of a respective wireless spectrum.

In contrast to conventional techniques, to provide a more efficient use of wireless spectrum, embodiments herein include adjusting transmit power levels of one or more wireless stations to accommodate current environmental conditions in a network environment.

As a more specific example, assume that a network environment includes a primary wireless access point as well as multiple wireless access points disposed in a vicinity of the primary wireless access point. Further assume that the multiple wireless access points are in sufficiently close proximity to the primary wireless access point such that the wireless communications transmitted from the primary wireless access point interfere or raise a noise floor associated with a respective wireless region in which the wireless access points reside.

In one embodiment, to determine nearby neighbors, the primary wireless access point as described herein monitors messages received from the multiple wireless access points in the network environment to identify which candidate wireless access points in the network environment potentially experience wireless interference (noise) caused by transmission of communications from the primary wireless access point.

To alleviate or reduce wireless interference, one embodiment includes performing a power transmit test. For example, in one embodiment, a communication management resource (residing at any suitable location in the network environment) communicates a power transmit test notification to the multiple wireless access points that are to participate in the testing of a primary wireless access point. The notification to the multiple wireless access points indicates attributes of a respective wireless power transmit test to be performed with respect to the primary wireless access point.

In accordance with further embodiments, the notification to the multiple wireless access points in a vicinity of the primary wireless access point specifies test information such as schedule of times (such as time slots, intervals, etc.) in which the primary wireless access point is scheduled to transmit each of multiple test communications for monitoring by the candidate wireless access points participating in the test.

In accordance with further embodiments and the wireless power transmit test, the primary wireless access point transmits (such as broadcasts) multiple test communications at different wireless power levels from the primary wireless access point to the multiple wireless access points participating in the testing of the primary wireless access point. In one embodiment, the multiple wireless access points monitor the communications transmitted from the primary wireless access point and provide feedback of same to a resource such as the communication management resource. The communication management resource initiates adjusting a wireless transmit power level of the primary wireless access point based on feedback generated by the multiple wireless access points.

In a more specific embodiment, the feedback associated with the wireless access points indicates wireless power levels (a.k.a., signal strength) at which the multiple monitoring wireless access points receive the test communications transmitted at different power levels from the primary wireless access point. The feedback provides an indication of a degree to which the wireless communications transmitted by the primary wireless access point appear as interference or noise to the respective wireless access points.

In one embodiment, using the feedback, the communication management resource reduces an amount of wireless interference caused by the primary wireless access point (to other wireless access points in a vicinity) by reducing a power output setting of the primary wireless access point. However, it should be noted that it is typically undesirable to reduce the power output setting of the primary wireless access point so low that it can no longer communicate with its corresponding mobile communication devices. Accordingly, embodiments herein include reducing a wireless power transmit level of the primary wireless access point but also finding a balance between reducing the power output setting of the primary wireless access point to reduce interference or noise with respect to the other wireless stations in the network environment as well as ensuring that the power output setting of the primary wireless access point is sufficiently high so that it the primary wireless access point is able to communicate with its own supported mobile communication devices. In other words, the communication management resource prevents reducing the power transmit level of the primary wireless access point to be so low that it can no longer communicate with its corresponding communication devices.

The multiple wireless access points can be notified of the power transmit test in any suitable manner. In one embodiment, the primary wireless access point communicates the power transmit test notification (indicating that a test is to be performed) to the multiple wireless access points.

The power transmit test notification can include any information such as an identity (such as BSSID) of the primary wireless access point under test, initial power transmit level of the primary wireless access point at the start of the power transmit test, the interval of the transmissions during which the test communications are transmitted, number of transmissions and intervals of the test, the difference or delta between power levels associated with each wirelessly communicated test sample in an interval, etc.

In accordance with further embodiments, during the power transmit test, the primary wireless access point can be configured to ramp the power transmit level of successively wireless communications transmitted during the test.

In one embodiment, the primary wireless access point ramps down the power transmit level over time from an initial power setting when generating successive wireless test communications monitored by the multiple wireless access points. Thus, in one embodiment, each of the multiple test communications can be transmitted at a successively lower wireless transmit power level from the primary wireless access point for signal strength analysis by the monitoring wireless access points.

In accordance with a scheduled power transmit test, at a first scheduled time such as specified by the power transmit test notification communicated to the multiple wireless access points, the primary wireless access point transmits a first wireless test communication at a first wireless power transmit level (such as an initial power level) from the primary wireless access point to the multiple wireless access points. At a second scheduled time such as specified by the power transmit test notification, the primary wireless access point transmits a second wireless test communication at a second wireless power transmit level from the primary wireless access point to the multiple wireless access points. In one embodiment, in accordance with ramping down of power transmit levels, the first wireless transmit power level is greater than the second wireless transmit power level.

Note that each of the wireless test communications can include any suitable information. For example, in one embodiment, each wireless test communication transmitted from the primary wireless access point includes information such as an identity (such as BSSID) of the primary wireless access point, a power level setting at which the primary wireless access point transmits a respective test communication, trial duration information such as a remaining amount of the power transmit test or intervals that have not yet been performed, etc.

In accordance with further embodiments, the primary wireless access point receives feedback from multiple communication devices in wireless communication with the primary wireless access point. The communication devices can be configured to provide information about the other wireless access points and/or the primary wireless access point. In one embodiment, the communication devices and/or primary wireless access point generate metrics indicating link quality such as an ability to wirelessly communicate over an existing link with the primary wireless access point. If link quality is low, this may indicate that the primary wireless access point transmits at too low of a power transmit level.

In accordance with still further embodiments, a communication management resource utilizes a combination of the feedback (such as first metrics) from the multiple communication devices and the feedback (such as second metrics) generated by the multiple wireless access points to adjust the transmit power level of the primary wireless access point to communicate with the multiple communication devices. For example, if the link quality as indicated by the mobile communication devices is detected as being poor, the management resource can be configured to increase a power transmit level of the primary wireless access point, regardless of the noise impact to nearby wireless access points. If the link quality as indicated by the mobile communication devices is sufficient (or higher than needed) and the multiple wireless access points indicate that the wireless test communications from the primary wireless access point are received at a high power level (indicating that wireless communications from primary wireless access point appear as high noise to the neighboring wireless access points), the management resource can be configured to reduce the power transmit level of the primary wireless access point for subsequent communications.

Note that the process of reducing the power transmit level of the primary wireless access point can be iterative such that the power transmit level of the primary wireless access point is changed fairly slowly over time.

As previously discussed, if poor link quality is detected between the primary wireless access point and corresponding communication devices, the communication management resource can be configured to increase a respective power transmit level of the primary wireless access point even though this increases a respective noise floor associated with the neighboring wireless access points.

Embodiments herein further include testing each of the wireless access points in a similar manner. For example, after testing a first wireless access point, another access point is designated as the access point under test to determine whether it is possible to lower its power transmit levels, but yet still provide sufficient link quality to its respective mobile communication devices.

Thus, as previously discussed, based on respective feedback generated by the multiple wireless access points during the power transmit test, a management resource reduces a transmit power level of subsequent communications transmitted from the primary wireless access point to mobile communication devices in communication with the primary wireless access point to reduce an amount of wireless interference (wireless noise) caused by the primary wireless access point to other the multiple wireless access points. The management resource finds a balance between reducing the power transmit level and maintaining the transmit power level of the primary wireless access point to be above a minimum power transmit threshold value needed to communicate from the primary wireless access point to the multiple mobile communication devices.

Note that further embodiments herein include a communication management resource operable to reduce wireless interference in a network environment using metrics associated with the neighboring wireless access points monitoring the test communications from the primary wireless access point as well as metrics associated with the communication devices in communication with the primary wireless access point.

More specifically, in one embodiment, the communication management resource receives first metrics (such as generated by multiple wireless access points participating in the above mentioned test) indicating an amount of wireless interference (noise) caused by a primary wireless access point to each of multiple wireless access points in a network environment. In one embodiment, in a manner as previously discussed, the multiple wireless access points generate the first metrics (indicating interference or noise levels) during the power transmit test during which the primary wireless access point transmits at different power levels and the multiple wireless access points monitor a signal strength of receiving such communications. Thus, the first metrics indicate a degree to which communications from the primary wireless access point interfere (or potentially interfere) with each of the multiple wireless access points.

In addition to the first metrics, the communication management resource further receives second metrics such as indicating a wireless link quality provided by the primary wireless access point to corresponding mobile communication devices in the network environment. As previously discussed, the communication management resource controls a wireless transmit level of the primary wireless access point to the mobile communication devices based on the first metrics and the second metrics.

In a more specific example embodiment, in accordance with the first metrics, the communication management resource reduces the wireless transmit level of the primary wireless access point to decrease the amount of wireless interference (wireless noise) caused by the primary wireless access point to each of multiple wireless access points in the network environment. In other words, if the multiple wireless access points indicate that they receive wireless communications from the primary wireless access point under test at high power levels, the communication management resource initiates reducing the power transmit level of the primary wireless access point.

As previously discussed, the communication management resource can be configured to prevent the power transmit level of the primary wireless access point from being set so low that the primary wireless access point is no longer able to support communications with the corresponding communication devices. For example, in one embodiment, the decreased wireless power transmit level of the primary wireless access point (as controlled by the communication management resource) is above a minimum wireless power threshold value required to support communications between the primary wireless access point and its supported mobile communication devices. Thus, the amount of reducing a power transmit level of a wireless access point is limited.

Embodiments herein are useful over conventional techniques. For example, as previously discussed, controlling levels of wirelessly communicating in a network environment reduces interference (wireless noise) and thus provides a better use of available wireless spectrum in a network environment.

Note that any of the resources as discussed herein can include one or more computerized devices, mobile communication devices, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate use of a wireless spectrum in a network environment. The instructions, when executed by computer processor hardware, cause the computer processor hardware (such as one or more co-located or disparately processor devices) to: communicate a notification from a primary wireless access point to multiple wireless access points in a network environment, the notification indicating a power transmit test; transmit multiple test communications at different wireless power levels from the primary wireless access point to the multiple wireless access points; and adjust a transmit power level of the primary wireless access point based on feedback generated by the multiple wireless access points.

Another embodiment herein includes a computer readable storage medium and/or system having instructions stored thereon to facilitate use of a wireless spectrum in a network environment. The instructions, when executed by computer processor hardware, cause the computer processor hardware (such as one or more co-located or disparately processor devices) to: receive first metrics indicating an amount of wireless interference caused by a primary wireless access point to each of multiple wireless access points in a network environment; receive second metrics indicating a wireless link quality provided by the primary wireless access point to corresponding mobile communication devices in the network environment; and control a wireless transmit level of the primary wireless access point to the mobile communication devices based on the first metrics and the second metrics.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of supporting wireless communications in a network environment. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

BRIEF DESCRIPTION OF THE DRAWINGS

FIG. 5 is an example diagram illustrating notification (scheduling) of a power transmit test according to embodiments herein.

FIG. 7 is an example diagram illustrating received power information generated by multiple wireless access points in a network environment monitoring test wireless communications form a primary wireless access point under test according to embodiments herein.

FIG. 11 is an example diagram illustrating transmit power adjustments according to embodiments herein.

Figure 1:
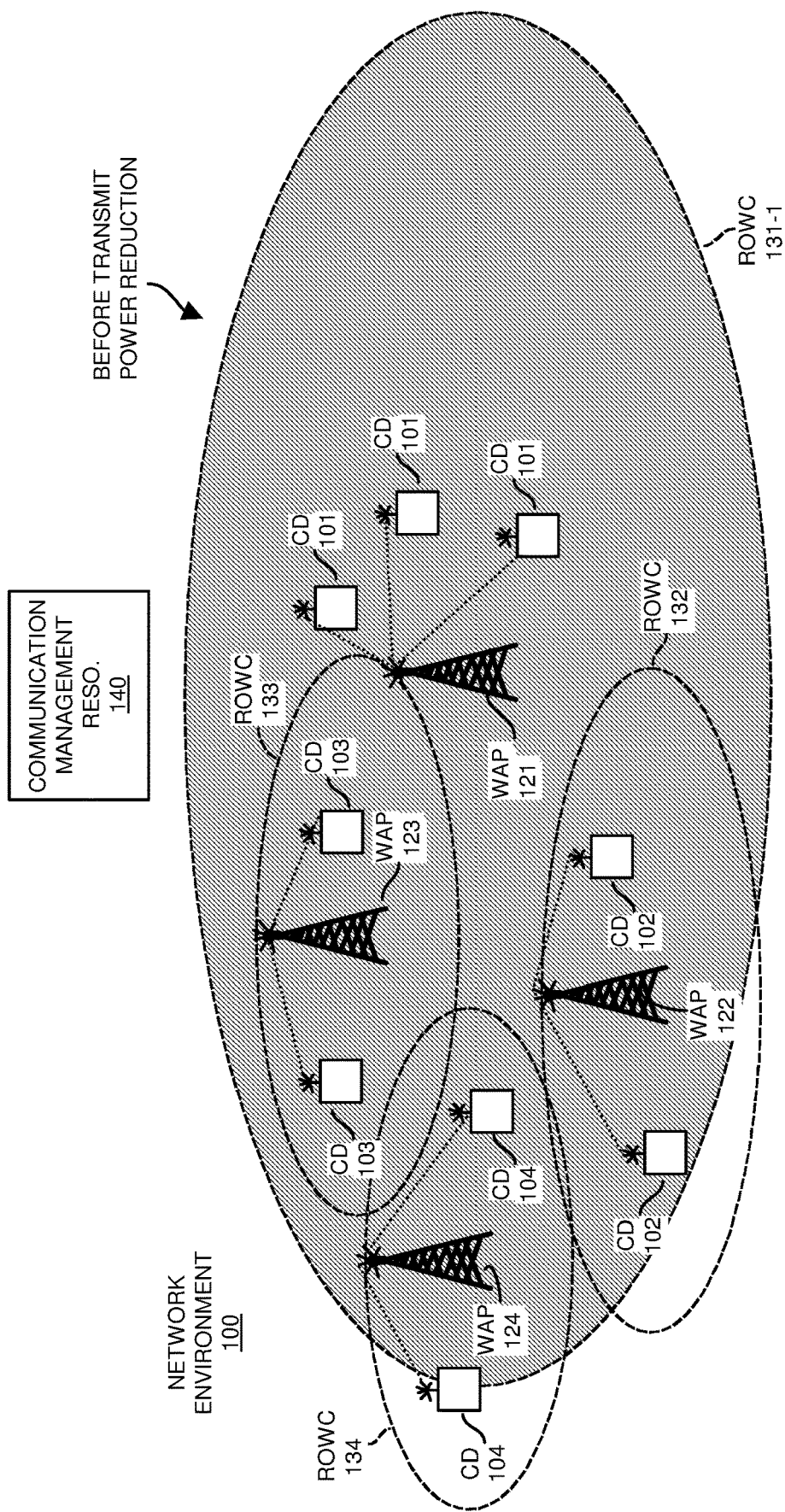
FIG. 1 is an example diagram illustrating a wireless network environment and detection of interference (noise) attributed to a primary wireless access point prior to adjusting wireless power transmit levels to the primary wireless access point according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

In accordance with general embodiments, a network environment includes a primary wireless access point (under test) in a vicinity of multiple wireless access points. To alleviate wireless interference (wireless noise) in the network environment, a management resource schedules a wireless power transmit test and communicates a notification of same to the multiple wireless access points. The notification indicates a wireless power transmit test to be performed with respect to the primary wireless access point in a vicinity of the multiple wireless access points.

In accordance with the wireless power transmit test, the primary wireless access point transmits multiple test communications at different wireless power levels from the primary wireless access point in a vicinity of the multiple wireless access points. The multiple wireless access points generate feedback (received signal strength of received test communications) based on an ability to receive the test communications. In one embodiment, the feedback indicates wireless power levels (signal strength) at which the multiple wireless access points receive the test communications transmitted at different power levels from the primary wireless access point. In accordance with control input from a communication management resource, the primary wireless access point adjusts its transmit power level based on feedback generated by the multiple wireless access points.

Now, more specifically, FIG. 1 is an example diagram illustrating a wireless network environment and detection of interference (noise) attributed to a primary wireless access point according to embodiments herein.

As shown, network environment 100 includes communication management resource 140, multiple wireless access points 121, 122, 123, 124, etc., and corresponding communication devices 101, 102, 103, 104, etc.

In this example embodiment, as shown, the wireless access point 121 transmits wireless communications at a corresponding power transmit level to provide wireless coverage 131 in network environment 100; the wireless access point 122 transmits wireless communications at a corresponding power transmit level to provide wireless coverage 132; the wireless access point 123 transmits wireless communications at a corresponding power transmit level to provide wireless coverage 133; the wireless access point 121 transmits wireless communications at a corresponding power transmit level to provide wireless coverage 134; and so on.

It is noted from FIG. 1 that the wireless access point 121 transmits at a needlessly high power transmit level. That is, the wireless coverage region 131-1 is much larger than needed to provide wireless connectivity to communication devices 101. The excessively high power transmit level of primary wireless access point 121 causes substantial noise to other wireless station in network environment such as wireless access points 122, 123, and 124, as well as communication devices 102, 103, and 104.

As previously discussed, network environment 100 includes communication management resource 140. Note that communication management resource 140 can reside at any suitable location such as at any of one or more wireless access points, communication devices, central location, etc. If desired, the operations performed by the communication management resource 140 can be split amongst one or more multiple wireless stations or it can be disposed at different locations in the network environment 100.

As its name suggests, the communication management resource 140 in this example embodiment manages communications associated with network environment 100 such that the one or more wireless access points provide better use of wireless resources (such as available wireless spectrum).

Note that any of the resources as described herein includes hardware or software resources (or a combination of both) in which to manage communications and settings associated with the wireless stations (wireless access points, communication devices, etc.). In other words, each of the resources as discussed herein can be configured as hardware and/or software. As a more specific example, the communication management resource 140 can be configured as monitor hardware and/or monitor software.

Each of the wireless access points (wireless stations) can be configured to compete with each other and/or communicate with each other in accordance with any suitable wireless protocol. For example, in one embodiment, the wireless access points can be configured to support LTE (Long Term Evolution) wireless communications in a CBRS (Citizens Band Radio System) environment; the wireless access points can be configured to support Wi-Fi™ communications (such as any 802.11 communications); and so on.

As previously discussed, since the wireless stations shares use of the same carrier frequencies, channels, etc., wireless communications from one wireless station appear as noise to another wireless station.

In contrast to conventional techniques in which the wireless stations set wireless transmit settings to a highest allowed level, embodiments herein include adjusting or reducing power transmit levels of one or more wireless stations depending on current environmental conditions in a network environment.

In this example embodiment, the network environment 100 includes a primary wireless access point 121 as well as multiple wireless access points 122, 123, and 124 disposed in a vicinity of the primary wireless access point 121.

The multiple wireless access points 121, 122, 123, and 124 are in sufficiently close proximity to each other that the wireless communications transmitted from the primary wireless access point 121 interfere with (or raise a noise floor associated with) the one or more wireless access points in close proximity.

In one embodiment, to learn of possible wireless stations that may be effected by the wireless communications from the wireless access point 121, the primary wireless access point 121 as described herein monitors messages received at the primary wireless access point 121 from the multiple wireless access points to identify which candidate wireless access points in the network environment 100 potentially experience wireless interference or noise caused by transmission of communications from the primary wireless access point. Assume that the primary wireless access point 121 detects wireless access points 122, 123, and 124 as being close proximity to itself.

To alleviate or reduce wireless interference, one embodiment includes communicating a power transmit test notification from the communication management resource 140 to the multiple wireless access points 121, 122, 123, and 124 that are to participate in the testing of the primary wireless access point 121.

In one embodiment, the notification to the wireless access points indicates attributes of a respective wireless power transmit test to be performed with respect to the primary wireless access point 121. For example, in one embodiment, as further discussed below, the notification to the multiple wireless access points in a vicinity of the primary wireless access point 121 specifies test information such as schedule of times (such as time slots, intervals, etc.) in which the primary wireless access point 121 is scheduled to transmit each of the multiple test communications for monitoring by the candidate wireless access points participating in the test.

As further discussed below, the wireless access points 122, 123, and 124 provide feedback to the communication management resource 140 indicating wireless signal strength levels at which the test communications from the primary wireless access point 121 are received. In one general embodiment, the communication management resource uses the feedback of signal strength information to control a power transmit level of the wireless access point 121.

In this example embodiment, assume that the communication management resource 140 detects that the wireless access point 121 needlessly transmits at high power transmit levels to the communication devices 101. This is shown pictorially in FIG. 1 since the wireless coverage region 131 extends far in distance beyond the communication devices 101. The communication management resource 140 also detects or determines a minimum wireless power transmit level that is needed to support communications between the wireless access point 121 and the communication devices 101.

Figure 2:
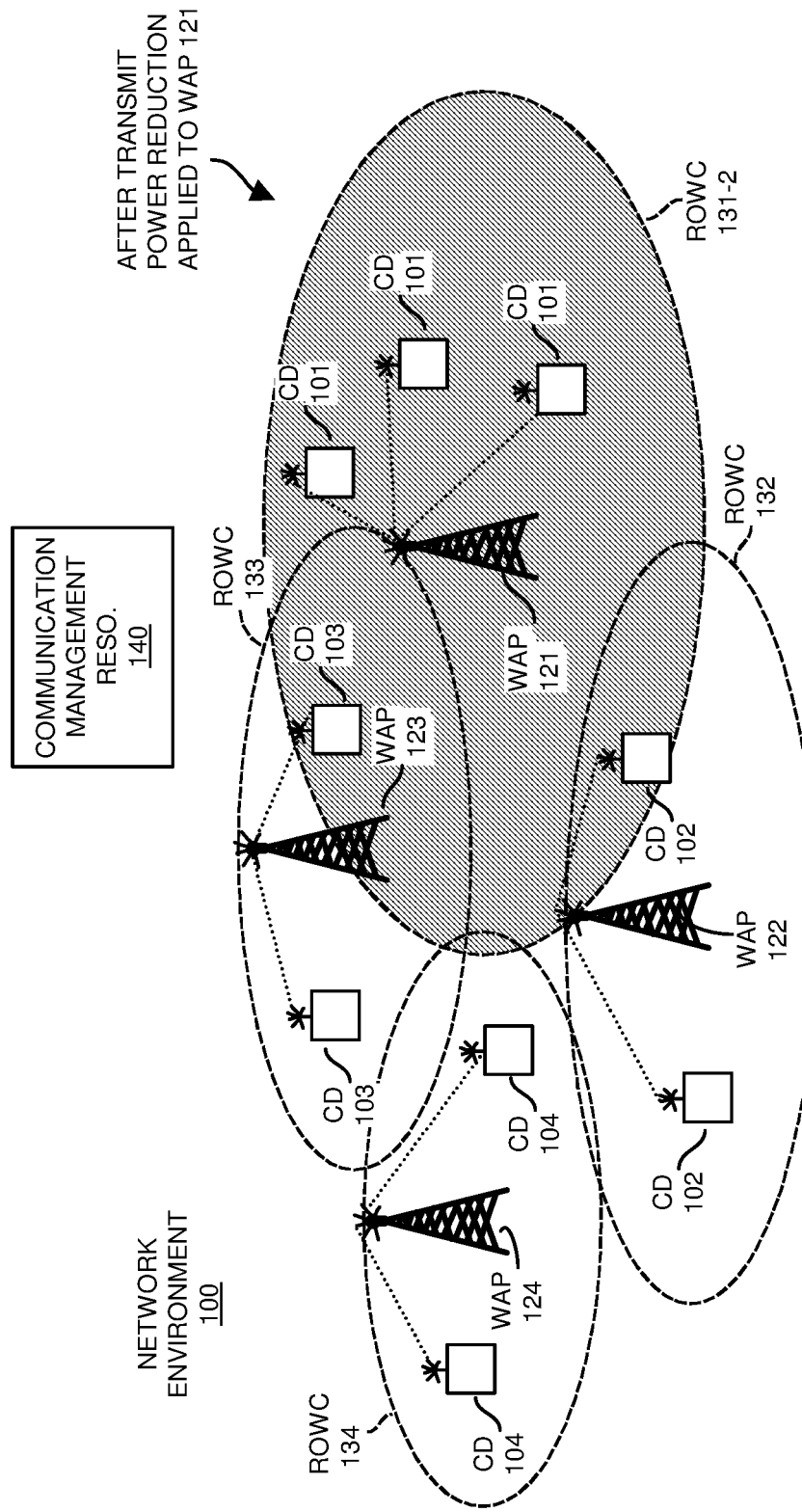
FIG. 2 is an example diagram illustrating a wireless network environment and implementation of power transmit level adjustments of a primary wireless access point according to embodiments herein.

In response to detecting that the primary wireless access point 121 transmits at a higher than necessary power transmit level to the communication devices 101 (e.g., the wireless coverage region 131-1 is larger than needed) and that the wireless communications from the primary wireless access point 121 cause at least some amount of wireless interference or raise a noise floor associated with nearby wireless access points 122, 123, and 124, the communication management resource 140 initiates reducing a power transmit level of the wireless access point 121 as further shown in FIG. 2.

FIG. 2 is an example diagram illustrating a wireless network environment and implementation of power adjustments to reduce noise according to embodiments herein.

As previously discussed, based on information such as respective feedback generated by the multiple wireless access points 122, 123, and 124 during the power transmit test, the communication management resource 140 reduces a transmit power level of subsequent communications transmitted from the primary wireless access point 121 to mobile communication devices 101. The lower power transmit level is evidenced by the reduced size of the wireless coverage region 131-2 shown in FIG. 2 in comparison to the wireless coverage region 131-1 in FIG. 1.

Referring again to FIG. 2, reducing the power transmit level setting of the wireless access point 121 reduces an amount of wireless interference (wireless noise) caused by the primary wireless access point 121 to the other wireless stations such as multiple wireless access points 122, 123, and 124 as well as corresponding communication devices 102, 103, and 104.

Note again that, in one embodiment, the communication management resource 140 finds a balance between reducing the power transmit level of the wireless access point 121 to reduce noise associated with other wireless stations and maintaining the transmit power level of the primary wireless access point 121 above a minimum power transmit threshold value needed to communicate from the primary wireless access point 121 to the multiple mobile communication devices 101.

Figure 3:
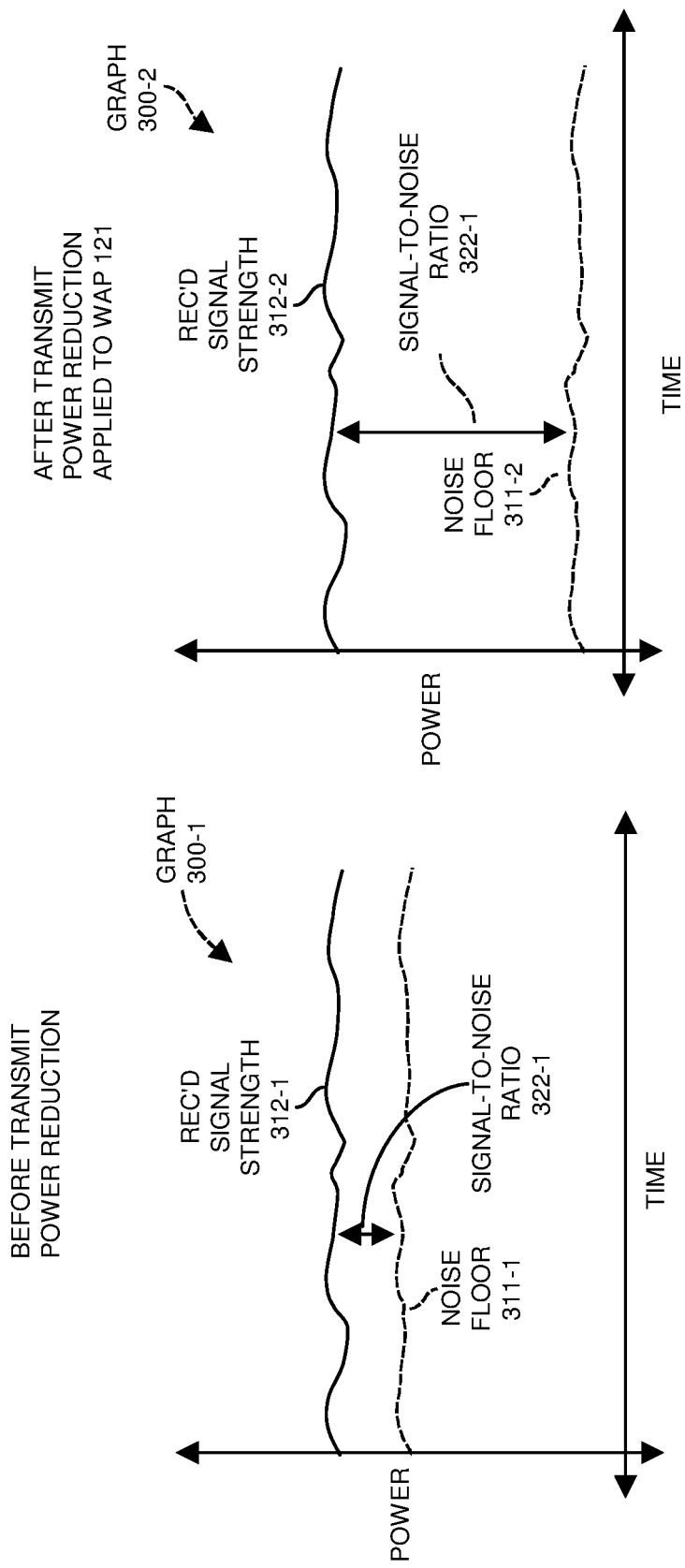
FIG. 3 is an example diagram illustrating effects of power transmit level adjustments according to embodiments herein.

FIG. 3 is an example diagram illustrating effects of power adjustments according to embodiments herein.

In this example embodiment, graph 300-1 indicates that the wireless communications from wireless access point 121 (based on a power transmit level setting as in FIG. 1) cause a high noise floor 311-1 in network environment 100 with respect to received signal strength 312-1 of a corresponding wireless communication transmitted in network environment 100. This results in a low signal to noise ratio 322-1 of receiving the corresponding wireless communication in network environment 100, which is undesirable. In other words, the high noise floor 311-1 caused by wireless access point 121 in FIG. 1 is intrusive to other wireless stations and reception of communications in the network environment 100.

Further in this example embodiment, graph 300-2 indicates that the wireless communications from wireless access point 121 (based on a reduced power transmit level setting as in FIG. 2) reduces a noise floor 311-2 with respect to received signal strength 312-2 of corresponding received wireless communications. This results in a high signal to noise ratio 322-1, which is desirable. Thus, the lower noise floor 311-2 (resulting from reducing the power transmit level of the wireless access point 121 in FIG. 2) is less intrusive to other wireless stations communicating in the network environment 100.

Figure 4:
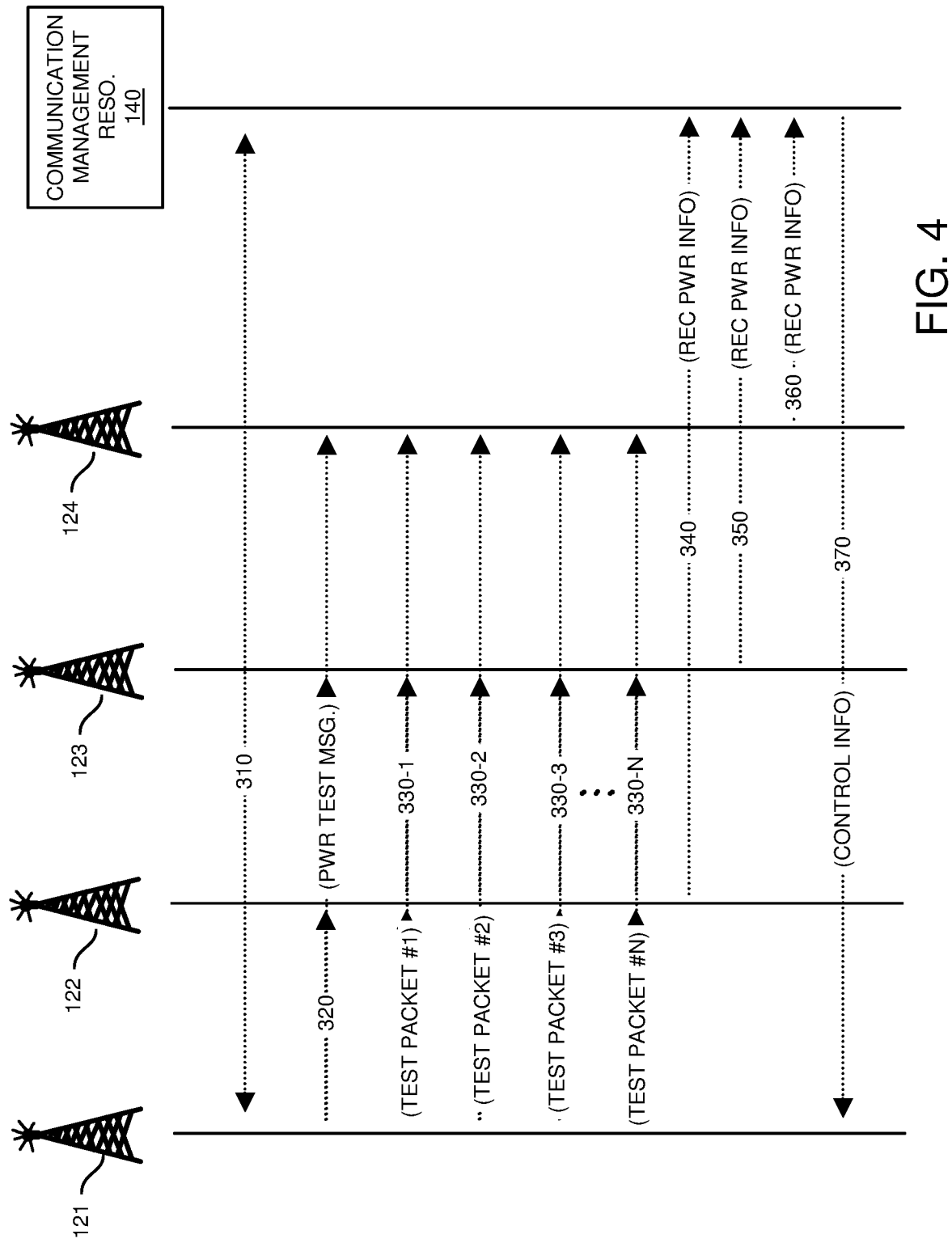
FIG. 4 is an example diagram illustrating implementation of an interference test and corresponding power transmit level adjustments according to embodiments herein.

FIG. 4 is an example diagram illustrating implementation of a noise test and corresponding power adjustments according to embodiments herein.

The example embodiment in FIG. 4 illustrates a way in which to implement a wireless communication test associated with a wireless access point.

More specifically, via communications 310, the communication management resource 140 notifies the wireless access point 121 that it is going to be tested for intrusiveness (noise interference) with respect to other wireless access points.

In one embodiment, the wireless access point 121 determines that wireless access points 122, 123, and 124 are in close proximity to the wireless access point 121 via receipt of beacons from each of the wireless access points 122, 123, and 124. These nearby wireless access points (122, 123, and 124) are chosen to be participants in the test performed by the wireless access point 121 because they may be susceptible to wireless interference caused by transmission of communications from wireless access point 121.

To carry out the test, the primary wireless access point 121 (or other suitable resource) transmits communications 320 (such as a power test message) notifying the neighboring wireless access points 122, 123, and 124 that they are participants in the communication test.

Note that as an alternative to transmitting communications 320 from the wireless access point 121, the notification (or corresponding contents indicating details of testing the wireless access point 121) to the wireless access points 122, 123, and 124, can be sent from any suitable resource. For example, the communication management resource 140 can be disposed at a central location and may be in communication with each of the wireless access points 121, 122, 123, and 124. In such an instance, the communication management resource 140 notifies the wireless access points of schedule information (such as associated with communications 320) in which the wireless access point 121 is to transmit test packets as well as a same schedule in which the wireless access points 122, 123, 124 are to monitor the test packets transmitted from the wireless access point 121.

FIG. 5 is an example diagram illustrating communications initiating a power transmit test according to embodiments herein.

In one embodiment, as shown in FIG. 5, the communications 320 (such as a power transmit test notification) transmitted from the primary wireless access point 121 under test (or other suitable resource) includes any suitable information such as an identity (such as BSSID #1) of the primary wireless access point 121 under test, an initial power transmit level at which the primary wireless access point 121 will initially transmit test packets, schedule information such as a time interval of the transmissions during which the test packet communications from the primary wireless access point will be transmitted, number of packet transmissions, number of intervals in which packets will be transmitted, and a difference or delta between power levels associated with each wirelessly communicated test sample from one interval to the next interval, etc.

In accordance with further embodiments, the communications 320 can indicate a specific start time of one or more timeslots or intervals in which the wireless access points are to monitor power reception for transmitted test packets.

Additionally, or alternatively, note that the communications 320 can indicate a discernable unique attribute of the test packets indicating that they are test packets for received signal strength assessment by the monitoring wireless access points 122, 123, and 124.

In this example embodiment, the communications 320 indicate 30 intervals (20 mS in duration) during which test communications (test packets) are communicated from the primary wireless access point 121 under test.

Thus, for a first timeslot or interval of 20 mS, as indicated by the communications 320, the primary wireless access point 121 transmits at a power transmit level of 90 (transmit units); for a second timeslot or interval of 20 mS, the primary wireless access point 121 transmits at a power transmit level of 87; for a third timeslot or interval of 20 mS, the primary wireless access point 121 transmits at a power transmit level of 84; . . . ; for the twenty eighth timeslot or interval of 20 mS, the primary wireless access point 121 transmits at a power transmit level of 9; for the twenty ninth timeslot or interval of 20 mS, the primary wireless access point 121 transmits at a power transmit level of 6; for the thirtieth first timeslot or interval of 20 mS, the primary wireless access point 121 transmits at a power transmit level of 3.

Referring again to FIG. 4, subsequent to notifying the wireless access points of the test via communications 320, in accordance with the wireless power transmit test, the primary wireless access point 121 transmits (such as broadcasts) multiple test communications 330 in respective timeslots (intervals) at different specified wireless power levels from the primary wireless access point 121 to the multiple wireless access points 122, 123, 124, participating in the testing of the primary wireless access point 121.

In accordance with further embodiments, during the power transmit test as previously discussed, the primary wireless access point 121 can be configured to ramp down the power transmit level of wireless communications 330 transmitted during each test interval. More specifically, in one embodiment, the primary wireless access point 121 ramps down the power transmit level over time with respect to an initial power setting when generating successive wireless test communications monitored by the multiple wireless access points. Thus, in one embodiment, each of the multiple test communications can be transmitted at a successively lower wireless transmit power level from the primary wireless access point for signal strength analysis by the monitoring wireless access points 122, 123, and 124.

As a more specific example, in accordance with a scheduled power transmit test, at a first scheduled time interval such as specified by the power transmit test notification (such as communications 320) communicated to the multiple wireless access points 122, 123, and 124, the primary wireless access point 121 transmits first wireless test communications 330-1 (such as test packet #1) at a first wireless power transmit level (such as an initial transmit power level of 90) from the primary wireless access point 121 to the multiple wireless access points 122, 123, and 124. Assume in this example embodiment that 90 is the highest possible power transmit level and 0 is the lowest possible power transmit level.

At a second scheduled time interval such as specified by the power transmit test notification (such as communications 320), the primary wireless access point 121 transmits the second wireless test communications 330-2 (such as test packet #2) at a second wireless power transmit level (such as power transmit level 87) from the primary wireless access point 121 for signal strength monitoring by the multiple wireless access points 122, 123, and 124.

At a third scheduled time interval such as specified by the power transmit test notification (such as communications 320), the primary wireless access point 121 transmits third wireless test communications 330-3 (such as test packet #3) at a third wireless power transmit level (such as power level 84) from the primary wireless access point 121 for signal strength monitoring by the multiple wireless access points 122, 123, and 124.

At a last ($N^{th}$) scheduled time such as specified by the power transmit test notification (such as communications 320), the primary wireless access point 121 transmits an $N^{th}$ wireless test communications 330-N at an $N^{th}$ wireless power transmit level (such as power transmit level of 3) from the primary wireless access point 121 for signal strength monitoring by the multiple wireless access points 122, 123, and 124.

Note that the test communications can be transmitted back-to-back, such as without any time delay between intervals. Alternatively, the primary wireless access point 121 can be configured to delay communications between each interval of transmitting test communications 330.

Figure 6:
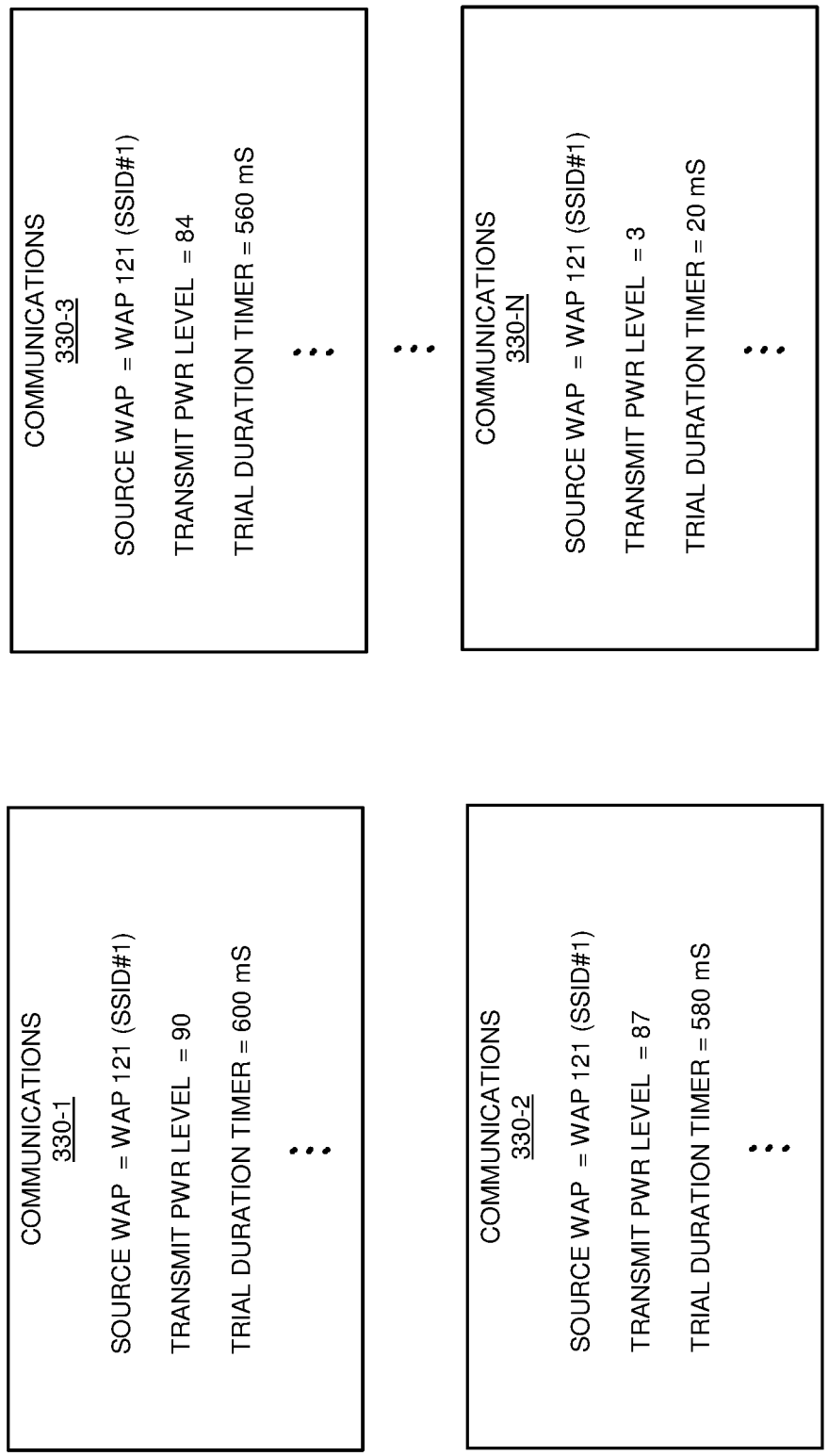
FIG. 6 is an example diagram illustrating test packets transmitted at different power levels according to embodiments herein.

FIG. 6 is an example diagram illustrating generation of test packets communicated at different power levels according to embodiments herein.

In this example embodiment, each of the wireless test communications 330 from primary wireless access point 121 under test can include any suitable information facilitating analysis of test communications wirelessly transmitted from the primary wireless access point 121.

For example, in one embodiment, each wireless test communication transmitted from the primary wireless access point 121 under test includes information such as an identity (such as BSSID) of the primary wireless access point 121, a power level setting at which the primary wireless access point 121 transmits a respective test communication, trial duration information such as a remaining amount of the power transmit test that has not yet been performed, etc.

As previously discussed, each of the test communications 330 can include further information such as unique attributes indicating a time interval (or timeslot) a respective communication is transmitted. To some extent, the inclusion of transmit power level information in each test packet (communications 330) indicates the interval because it is known from schedule information (via communications 320) that the primary wireless access point 121 starts a transmission at a level of 90 units and decrements by 3 units each successive interval of transmitting a next test packet (as indicated in communications 320). In other words, if the wireless access point receives a communication indicating that it was sent a power level of 90, the wireless access point knows that the communication was transmitted in the first timeslot or interval.

Further in this example embodiment, communications 330-1 (communicated to the wireless access points 122, 123, and 124 for monitoring) includes an identity of the primary wireless access point 121, a transmit power level of transmitting the communication 330-1, a timer value (or interval identifier value) such as 600 milliseconds (such as an amount of time left in the test or specific time in the test), etc.

In a similar manner, each of the transmitted communications 330-2, 330-3, . . . , 330-N, includes corresponding information about the respective test communications from wireless access point 121.

Referring again to FIG. 4, in one embodiment, each of the multiple wireless access points 122, 123, and 124, monitors the communications 330 transmitted from the primary wireless access point 121 in each of the scheduled time intervals.

As previously discussed, in one embodiment, each of the wireless access points 122, 123, and 124 monitors a respective signal strength at which each of the test communications 330 is received by the corresponding wireless access point. Generation of signal strength reception information is more particularly shown in FIG. 7.

FIG. 7 is an example diagram illustrating received power information generated by multiple wireless access points in a network environment according to embodiments herein.

In a more specific embodiment, the feedback associated with the wireless access points indicates wireless power levels (a.k.a., signal strength) at which the multiple wireless access points receive the test communications 330 transmitted at different power levels from the primary wireless access point 121. The communications 340, 350, and 360 provide an indication of a degree to which the wireless communications transmitted by the primary wireless access point appear as interference or noise to the respective monitoring wireless access points.

In this example embodiment, assume that a receive signal power value of 70 (power reception units) indicates a high power level of receiving a communication; a value of 0 (power reception units) indicates that a respective communication from the primary wireless access point 121 is no longer detected by a wireless access point.

For example, communications 340 from wireless access point 122 indicate the different signal strength power levels at which the wireless access point 122 receives the test communications 330-1, 330-2, . . . , 330-18 from the wireless access point 121. As indicated by the communications 340, the wireless access point 122 receives the communications 330-1 (test packet #1) at a receiver power level of 60. As further shown, the wireless access point 122 no longer detects test packets transmitted by the wireless access point 121 after test packet #19 (interval or timeslot #19). Thus, it is known at what power level (i.e., power transmit level=36) the wireless access point 121 can transmit wireless communications without such communications raising a noise floor or substantially interfering with the wireless access point 122.

In a similar manner, as indicated by the communications 350, the monitoring wireless access point 123 detects test packets 1-23 but no longer detects test packets transmitted by the wireless access point 121 after test packet #23 (interval or timeslot #23). Thus, it is known at what power level (i.e., power transmit level=21) the wireless access point 121 can generally transmit wireless communications without being seen as insurmountable noise or interfering with the wireless access point 123.

In a similar manner, as indicated by the communications 360, the wireless access point 124 detects test packets 1-7 but no longer detects test packets transmitted by the wireless access point 121 after test packet #7. Thus, it is known at what power level (i.e., power transmit level=69) the wireless access point 121 can transmit wireless communications without being seen as noise or interfering with the wireless access point 124.

Based on such feedback, it may be desirable to reduce a transmit power level of the wireless access point 121 to a power transmit level of around 21 (from a previously transmitted higher level) because none of the wireless access points 122, 123, and 124 experiences interference from the primary wireless access point 121 at that power transmit level (21). Depending on a minimum power level needed to support communications with the communication devices 101, this may or may not be possible. For example, the wireless access point 121 may need to transmit at a power transmit level of at least 30 in order to communicate with communication devices 101. In such an instance, it is not possible to reduce the power transmit level of the wireless access point 121 to 21 because a minimum power transmit level of 30 is needed. Conversely, if a minimum power transmit level of 15 is needed to communicate from the wireless access point 121 to the communication devices 101, then it is possible to lower the power transmit level of the wireless access point 121 to a power transmit level of 21.

Referring again to FIG. 4, the communication management resource 140 receives feedback (such as communications 340, 350, and 360) from the multiple wireless access points receiving test communications from the primary wireless access point 121.

In accordance with further embodiments, in addition to receiving the communications 340, 350, and 360, note that the sets of communication devices 101, 102, 103 and 104, can be configured to provide information about the wireless access points and received signal strength information (of respective received communications from any of the wireless access points). In one embodiment, the monitor information from the communication devices indicating which of the wireless access points provide overlapping regions of wireless coverage to the different communication devices.

In one embodiment, the communication devices and/or wireless access points generate metrics indicating link quality representing an ability to wirelessly communicate over an existing link with the primary wireless access point. If respective link quality from a wireless access point is low poor (such as due to dropped communications, communication errors, low signal strength, etc.), this may indicate that the primary wireless access point transmits at too low of a power transmit level and the power transmit level of the wireless access point 121 needs to be increased.

In accordance with still further embodiments, the communication management resource 140 utilizes a combination of the feedback from the multiple communication devices 101, 102, 103, and 104, feedback (such as communications 340, 350, 360, etc.) from the wireless access points 121, 122, 123, and 124 to adjust the transmit power level of the primary wireless access point 121 to communicate with the multiple communication devices 101.

For example, if the link quality as indicated by the mobile communication devices 101 and/or wireless access point 121 is detected as being poor such as below a threshold value, the management resource can be configured to increase a power transmit level of the primary wireless access point 121 to ensure that communications are received by the communication devices, regardless of the noise impact to nearby wireless access points 122, 123, and 124.

If the link quality as indicated by the mobile communication devices 101 and/or wireless access point 121 is sufficient (or possibly better than needed) and the multiple wireless access points 122, 123, and 124 indicate that the wireless test communications 330 are received at a high power level (indicating that wireless communications from primary wireless access point 121 appear as high noise to the neighboring wireless access points, especially wireless access points 122 and 123), the communication management resource 140 can be configured to reduce the power transmit level of the primary wireless access point 121 for subsequent transmitted communications.

Note that the process of reducing the power transmit level of the primary wireless access point 121 can occur in an iterative such that the power transmit level of the primary wireless access point is changed fairly slowly over time. As previously discussed, if poor link quality is detected at any time between the primary wireless access point and corresponding communication devices, the communication management resource 140 can be configured to increase a respective power transmit level of the primary wireless access point 121 even though this increases a respective noise floor associated with the neighboring wireless access points 122, 123, and 124.

As previously discussed, using the feedback communications 340, 350, 360, the communication management resource 140 reduces an amount of wireless interference caused by the primary wireless access point 121 (to other wireless access points 122, 123, 124 as indicated by FIG. 2) by reducing a power output setting of the primary wireless access point as indicated by FIG. 2. However, as previously discussed, it should be noted that it is typically undesirable to reduce the power output setting of the primary wireless access point 121 so low that it can no longer communicate with its corresponding mobile communication devices 101. Accordingly, embodiments herein include finding a balance between reducing the power transmit level setting of the primary wireless access point 121 to reduce interference or noise with respect to the other wireless access points 122, 123, and 124 as well as ensuring that the wireless power output setting of the primary wireless access point 121 is not so low that it is no longer to be able to communicate with its own supported mobile communication devices 101.

Embodiments herein further include testing and adjusting power associated with each of the wireless access points in a similar manner. For example, after testing a wireless access point 121, another access point such as wireless access point 122 is designated as the access point under test with respect to monitoring wireless access points 121, 123, and 124 to determine whether it is possible to lower the power transmit level of the wireless access point 122, but yet still provide sufficient link quality to its respective mobile communication devices 102.

As previously discussed, repeated testing and adjustments to the power transmit levels of each of the wireless access points ensures low noise and high link quality between the wireless access points and respective communication devices. This provides a better use of wireless frequencies, especially in high density areas including many wireless access points and respective communication devices.

Figure 8:
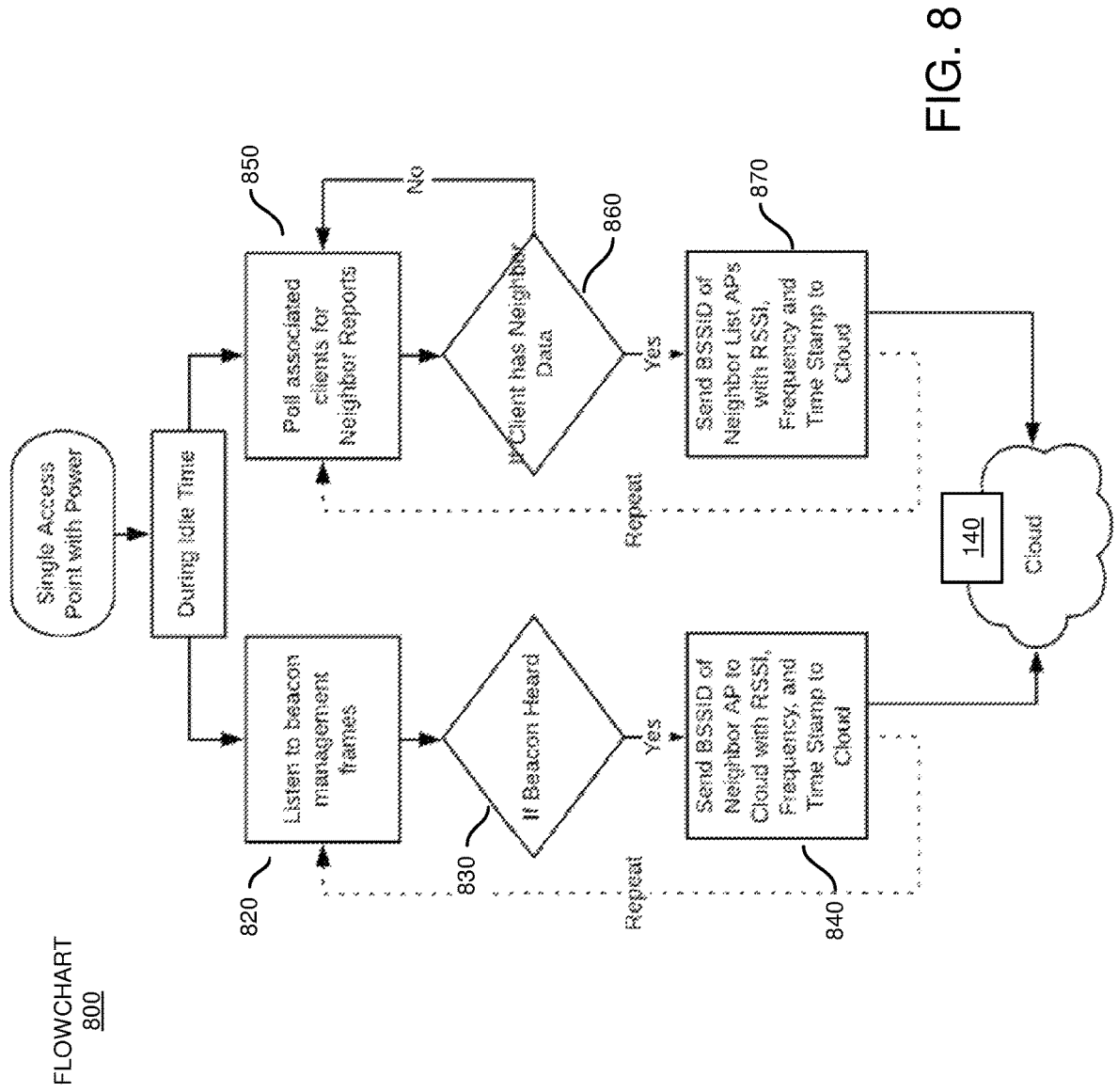
FIG. 8 is an example diagram illustrating monitoring of wireless access points and communication devices in the network environment according to embodiments herein.

FIG. 8 is an example diagram illustrating monitoring of wireless access points and communication devices in the network environment according to embodiments herein.

In general, the flowchart 800 in FIG. 8 illustrates operations of a primary wireless access point 121 to produce neighbor information indicating nearby wireless access points. In one embodiment, the neighbor information is used (by the communication management resource 140 or other suitable resource) to check for conditions such as overlapping wireless coverage provided by wireless access points from the perspective of respective communication devices, link quality between the primary wireless access point 121 and respective communication devices 101, etc.

More specifically, during idle time, in processing operation 820 of flowchart 800, the wireless access point 121 listens in wireless network environment 100 for beacon frames (indicating presence of transmitting wireless access points) communicated from corresponding neighboring wireless access points 122, 123, 124, etc., in network environment 100.

In processing operation 830, if the wireless access point 121 receives a respective beacon from a wireless access point, the wireless access point creates a list and communicates (such as via neighbor information) the identity of the detected neighboring access point to the communication management resource 140 in processing operation 840. Note that, in one embodiment, the wireless access point 121 is configured to monitor a signal strength of communications from the neighboring wireless access point as well as corresponding wireless channels or carrier frequencies used by the nearby wireless access points. In accordance with further embodiments, the wireless access point 121 communicates this information to the communication management resource 140.

Further, in processing operation 850, the wireless access point 121 polls the communication devices 101 to generate a respective neighbor report of communication devices. In one embodiment, the communication devices 101 monitor the network environment 100 for presence of other wireless access points.

In processing operation 860, if no clients (such as communication devices 101) detect presence of any neighbor wireless stations, processing in flowchart 800 loops back to processing operation 850. Alternatively, if a communication device indicates presence of a neighbor wireless access point, the wireless access point 121 communicates identities of those corresponding wireless access points as well as signal strength information (from a perspective of the communication devices receiving wireless signals from the detected one or more wireless access points) and corresponding frequency information (such as used channels) to the communication management resource 140.

In this manner, wireless access point 121 collects wireless station information and reports such neighbor information to the communication management resource 140.

Note that the above processing of monitoring the wireless network environment 100 can be repeated for each of the wireless access points. In such an instance, the communication management resource 140 receives neighbor information obtained from multiple different wireless station perspectives.

Figure 9:
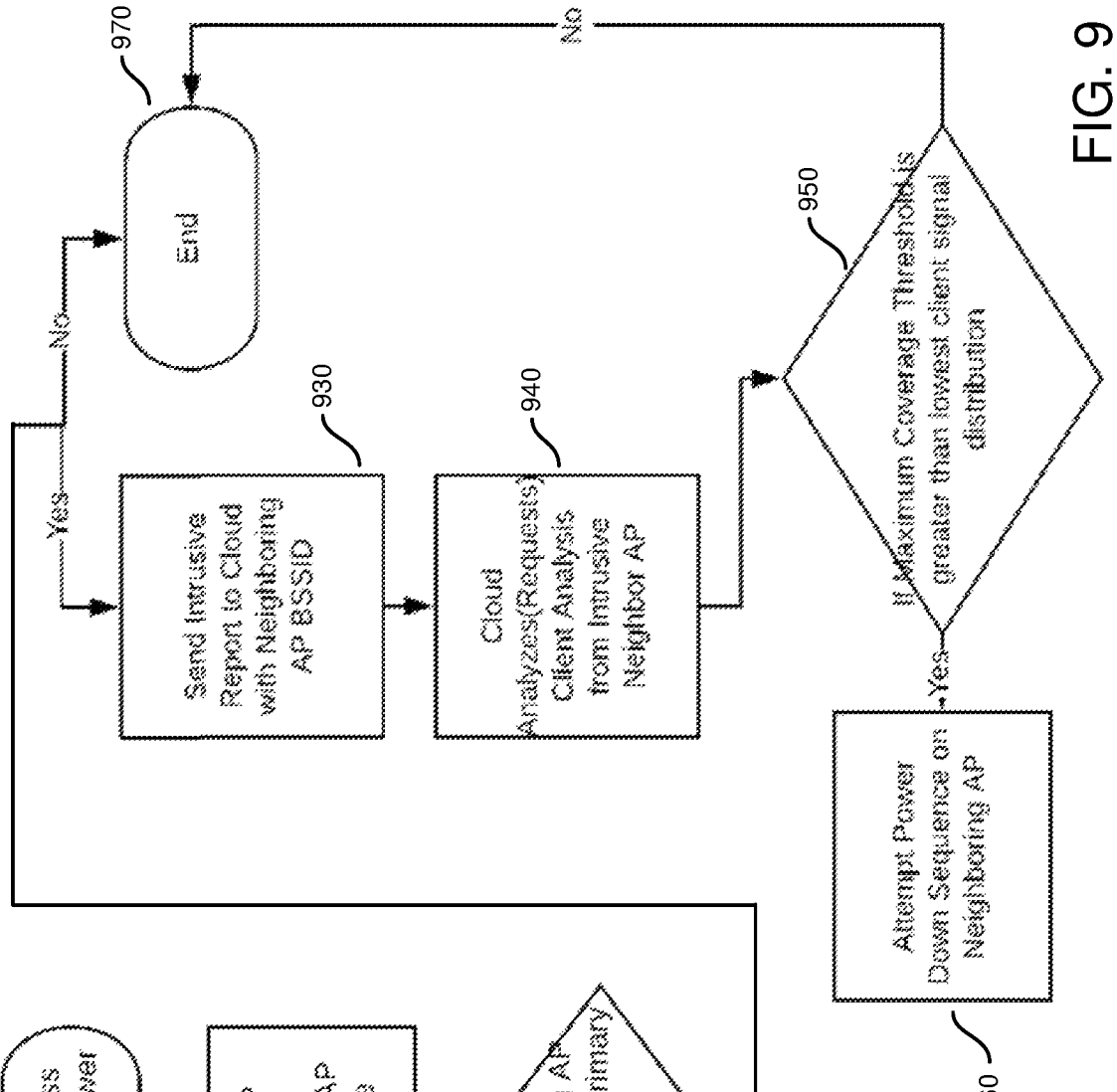
FIG. 9 is an example diagram illustrating a technique of assessing a degree of intrusiveness by a neighboring wireless access point according to embodiments herein.

FIG. 9 is an example flowchart diagram illustrating a technique of assessing the degree of intrusiveness by a neighboring wireless access point according to embodiments herein.

In processing operation 910, a wireless station in network environment 100 such as each of the wireless access points 122, 123, and 124 assess neighboring access point interference caused by wireless access point 121.

In processing operation 920, if the neighboring access point interferes with a primary signal, processing flow continues with processing operation 930.

In processing operation 930, the wireless access points send a report of intrusiveness to the communication management resource 140. In one embodiment, the report provides notification of identities of the intrusive neighbor wireless access points to the communication management resource 140.

In processing operation 940, the communication management resource 140 (such as in the cloud or other suitable location) analyzes the received information.

In processing operation 950, the communication management resource determines if the maximum coverage threshold is greater than the lowest client signal distribution. If so, in processing operation 960, the communication management resource attempts a power down sequence on the primary wireless access point 121. If not, processing ends at processing operation 970.

This process can be repeated to adjust power transmit levels of each wireless access point potentially causing interference to one or more other wireless access points in network environment 100.

Figure 10:
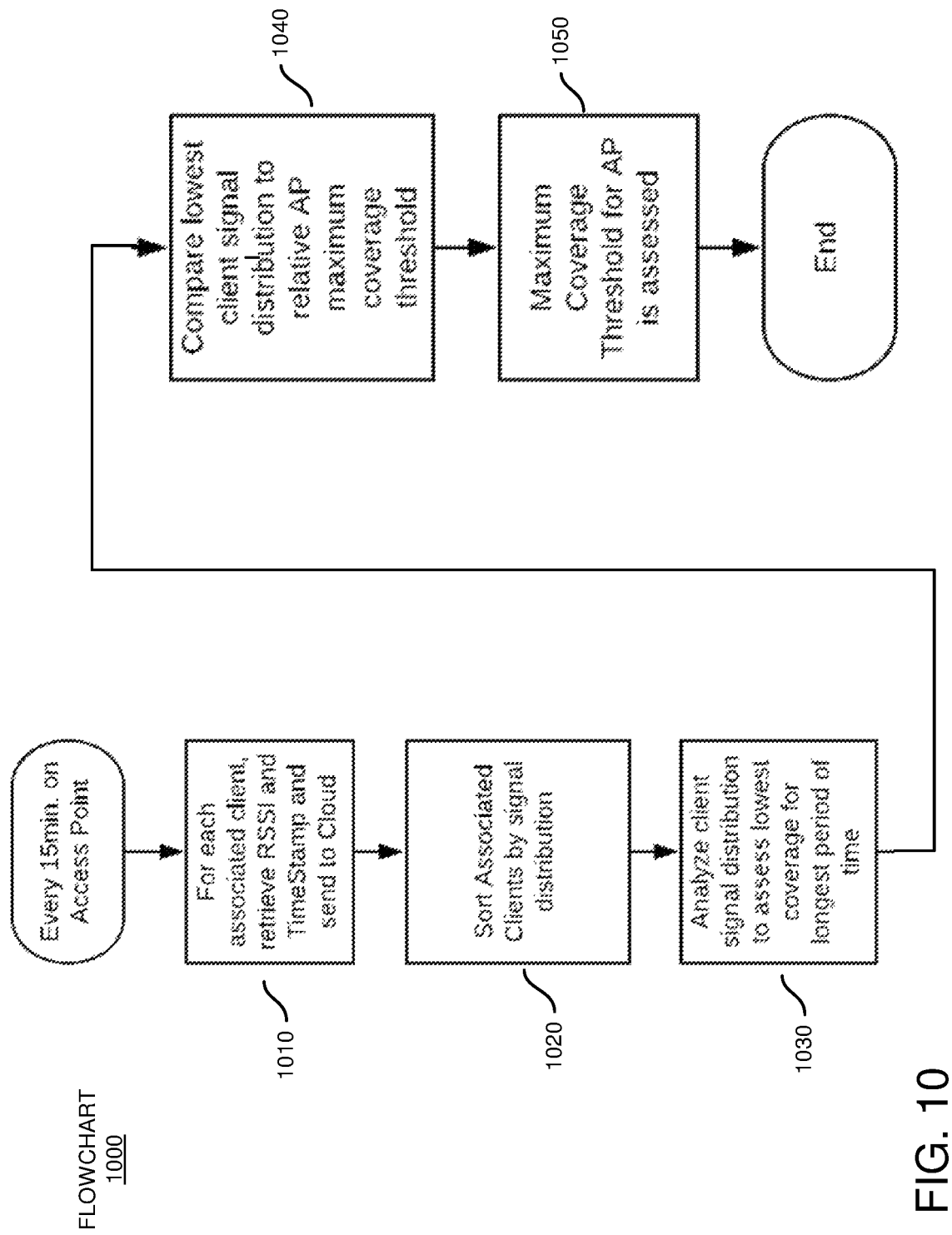
FIG. 10 is an example diagram illustrating calculation of a minimum power reduction threshold according to embodiments herein.

FIG. 10 is an example diagram illustrating calculation of a minimum power reduction threshold according to embodiments herein.

In general, the flowchart 1000 in FIG. 10 illustrates operations of determining a minimum power transmit level threshold value that is needed to support wireless communications between a wireless station such as the primary wireless access point 121 and corresponding communication devices 101.

In processing operation 1010, for each of the communication devices 101, the primary wireless access point 121 receives signal strength information (of the communication devices receiving wireless communications from the wireless access point 121 and potentially other wireless access points) and forwards such information to the communication management resource 140.

In processing operation 1020, the communication devices 101 are sorted based on signal distribution information in operation 1010.

In processing operation 1030, the communication device signal distribution information is analyzed to assess the lowest wireless coverage for longest period of time.

In processing operation 1040, the lowest client signal distribution value is compared to the relative access point maximum coverage threshold value.

In processing operation 1050, the maximum coverage threshold for the access point is assessed.

FIG. 11 is an example diagram illustrating transmit power adjustments according to embodiments herein.

In general, the flowchart 1100 in FIG. 11 illustrates operations of reducing a power transmit level of a respective primary wireless access point to reduce wireless interference caused by the primary wireless access point to other wireless access points.

In processing operation 1110, the communication management resource 140 (such as implemented via cloud processing or other suitable processing) receives the communications 340, 350, and 360 from the wireless access points 122, 123, and 124 located nearby primary wireless access point 121.

In processing operation 1120, the communication management resource 140 analyzes the highest receives signal strength information in the power level information received from the communications 340, 350, and 360.

In processing operation 1130, the communication management resource 140 determines if the highest received signal strength information in operation 1120 is greater than a minimum power reduction threshold value. If so, the communication management resource 140 executes processing operation 1140 in which the communication management resource 140 sends a power down command to set the power transmit level of the primary wireless access point 121 to the highest signal strength value. If not, in processing operation 1150, the communication management resource 140 generates a power down result in which the power transmit level of the primary wireless access point is set to the minimum power reduction threshold value.

Thus, as previously discussed, if it is beneficial to lower the power transmit level of the primary wireless access point and it is known that the reduced power transmit level will provide sufficient wireless coverage to corresponding communication devices 101, the communication management resource 140 reduces the power transmit level of the primary wireless access point 121 to reduce an amount of corresponding noise to the neighboring wireless access points 122, 123, and 124. Alternatively, if it is known that a proposed reduction in power transmit level of the primary wireless access point 121 would be lower than a threshold power value setting needed to communicate with the communication devices 101, the communication management resource 140 sets the power transmit level of the primary wireless access point 121 to be the minimum threshold power transmit level needed to communicate with the communication devices 101.

Figure 12:
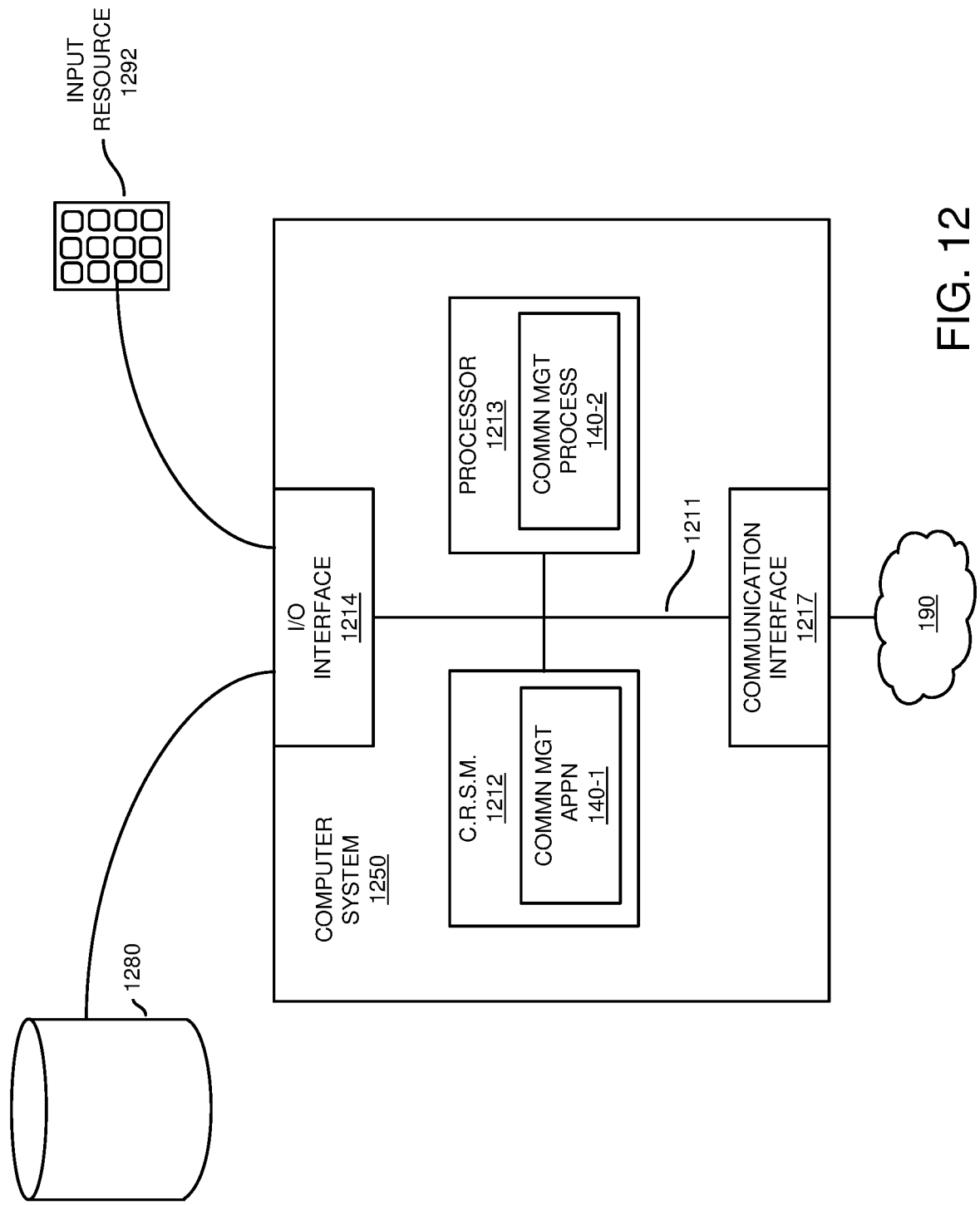
FIG. 12 is an example diagram illustrating example computer architecture operable to execute one or more operations according to embodiments herein.

FIG. 12 is an example block diagram of a computer system for implementing any of the operations as previously discussed according to embodiments herein.

Any of the resources (such as communication management resource 140, wireless access point 121, wireless access point 122, wireless access point 123, wireless access point 124, etc.) as discussed herein can be configured to include computer processor hardware and/or corresponding executable instructions to carry out the different operations as discussed herein.

As shown, computer system 1250 of the present example includes an interconnect 1211 that couples computer readable storage media 1212 such as a non-transitory type of media (which can be any suitable type of hardware storage medium in which digital information can be stored and retrieved), a processor 1213 (computer processor hardware), I/O interface 1214, and a communications interface 1217.

I/O interface(s) 1214 supports connectivity to repository 1280 and input resource 1292.

Computer readable storage medium 1212 can be any hardware storage device such as memory, optical storage, hard drive, floppy disk, etc. In one embodiment, the computer readable storage medium 1212 stores instructions and/or data.

As shown, computer readable storage media 1212 can be encoded with communication management application 140-1 (e.g., including instructions) to carry out any of the operations as discussed herein.

During operation of one embodiment, processor 1213 accesses computer readable storage media 1212 via the use of interconnect 1211 in order to launch, run, execute, interpret or otherwise perform the instructions in communication with bank letters the check. For the communication management application 140-1 stored on computer readable storage medium 1212. Execution of the communication management application 140-1 produces communication management process 140-2 to carry out any of the operations and/or processes as discussed herein.

Those skilled in the art will understand that the computer system 1250 can include other processes and/or software and hardware components, such as an operating system that controls allocation and use of hardware resources to execute communication management application 140-1.

In accordance with different embodiments, note that computer system may reside in any of various types of devices, including, but not limited to, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 850 may reside at any location or can be included in any suitable resource in any network environment to implement functionality as discussed herein.

Functionality supported by the different resources will now be discussed via flowcharts in FIGS. 13-14. Note that the steps in the flowcharts below can be executed in any suitable order.

Figure 13:
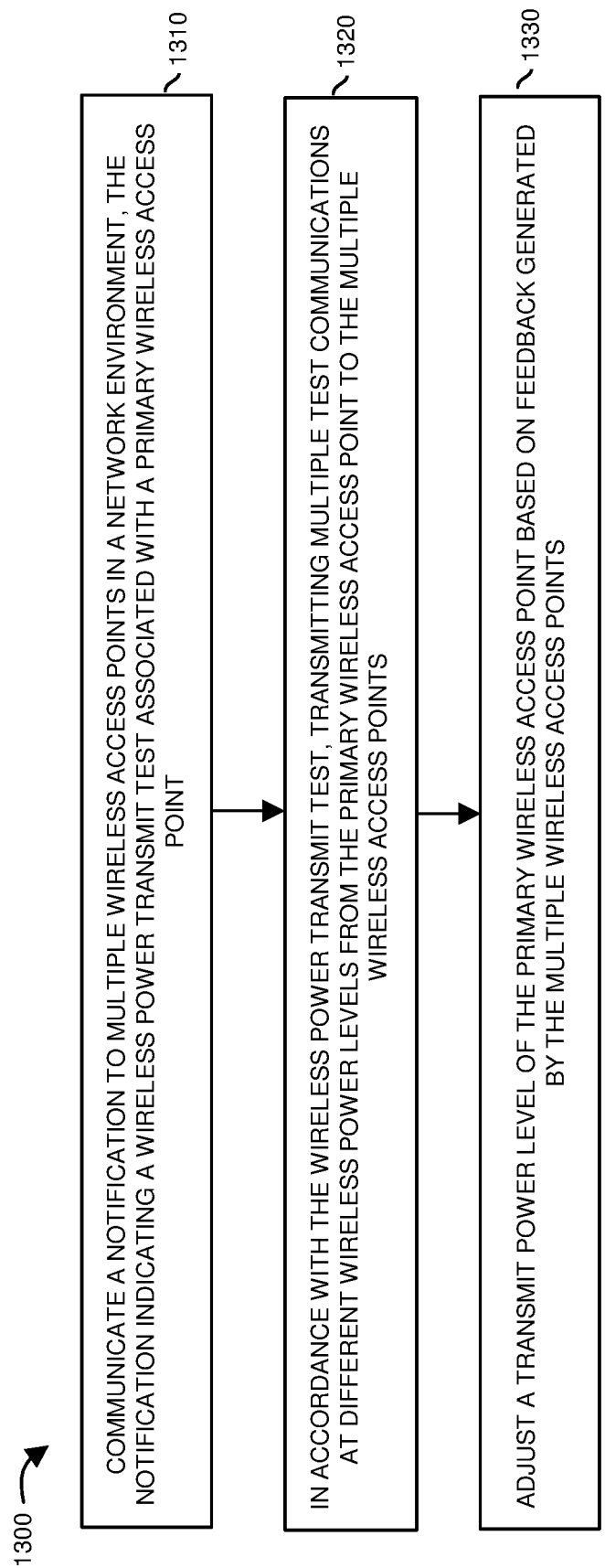
FIGS. 13 and 14 are example diagrams illustrating methods according to embodiments herein.

FIG. 13 is a flowchart 1300 illustrating an example method according to embodiments. Note that there will be some overlap with respect to concepts as discussed above.

In processing operation 1310, a communication management resource 140 (such as resident in the primary wireless access point 121 or other suitable location) communicates a notification (via communications 330-1 to multiple wireless access points (such as wireless access points 122, 123, 124, etc.) in a network environment 100. The notification indicates a wireless power transmit test associated with the primary wireless access point 121.

In processing operation 1320, in accordance with the wireless power transmit test indicated by communications 320, the primary wireless access point 121 transmits (such as broadcasts) multiple test communications (such as communications 330-1, communications 330-2, communications 330-3, etc.) at different wireless power levels from the primary wireless access point 121 to the multiple wireless access points 122, 123, and 124.

In processing operation 1330, the primary wireless access point 121 adjusts its transmit power level based at least in part on feedback (such as communications 340, 350, and 360) generated by the multiple wireless access points 122, 123, and 124.

Figure 14:
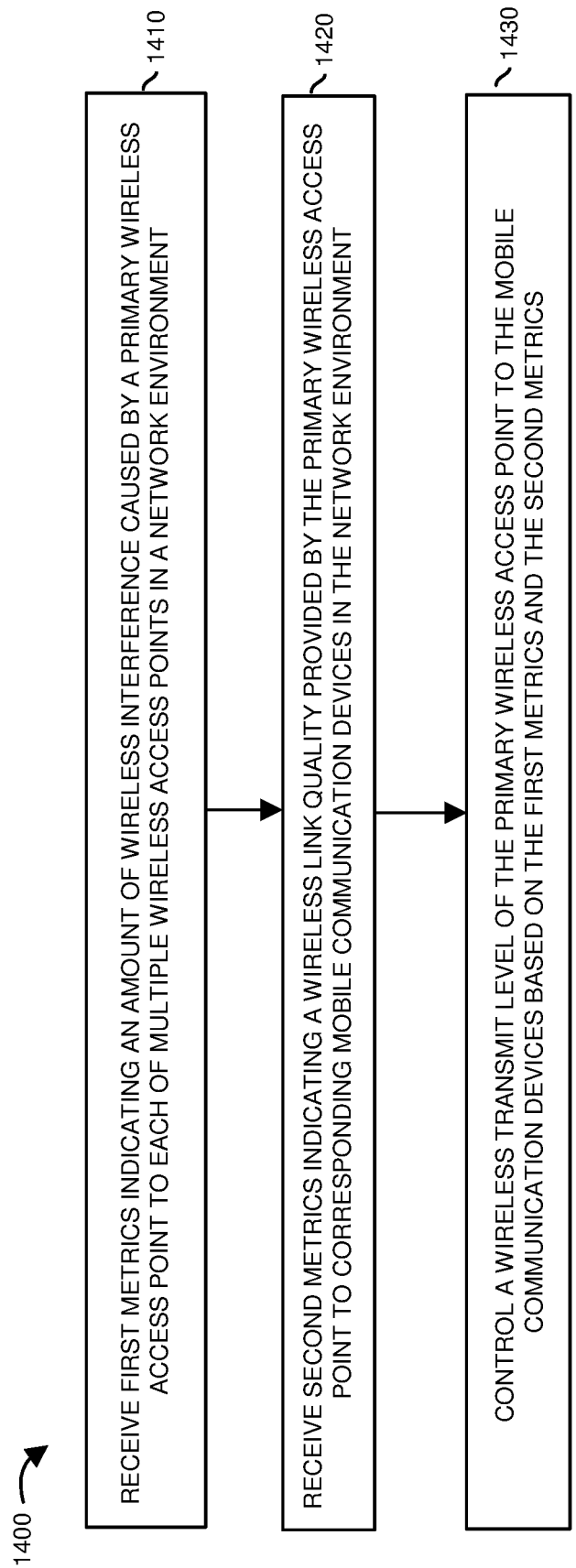

FIG. 14 is a flowchart 1400 illustrating an example method according to embodiments. Note that there will be some overlap with respect to concepts as discussed above.

In processing operation 1410, the communication management resource 140 receives first metrics (such as via communications 340, 350, and 360) indicating an amount of wireless interference (noise) caused by primary wireless access point 121 to each of multiple wireless access points 122, 123, and 124 in a network environment 100.

In processing operation 1420, the communication management resource 140 receives second metrics (such as via communications 310) indicating wireless link quality provided by the primary wireless access point 121 to corresponding mobile communication devices 101 in the network environment 100.

In processing operation 1430, the communication management resource 140 controls a wireless transmit level of subsequent wireless communications from the primary wireless access point 121 to the mobile communication devices 101 based on the first metrics and the second metrics.

Note again that techniques herein are well suited to facilitate testing and dynamic control of transmit power levels of one or more wireless access points to reduce interference amongst each other. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
    at a primary wireless access point, receiving a notification, the notification communicated to multiple wireless access points in a network environment, the notification indicating a wireless power transmit test associated with the primary wireless access point;
    in accordance with the wireless power transmit test, transmitting multiple test communications at different wireless power levels from the primary wireless access point to the multiple wireless access points; and
    adjusting a transmit power level of the primary wireless access point based on feedback received from the multiple wireless access points, the feedback indicating wireless power levels at which the multiple wireless access points receive the multiple test communications transmitted at the different wireless power levels from the primary wireless access point.

2. The method as in claim 1, wherein transmitting the multiple test communications includes:
    at a first scheduled time as specified by the notification, transmitting a first wireless test communication from the primary wireless access point to the multiple wireless access points; and
    at a second scheduled time specified by the notification, transmitting a second wireless test communication from the primary wireless access point to the multiple wireless access points.

3. The method as in claim 2, wherein the first wireless test communication is transmitted at a first wireless power transmit level from the primary wireless access point; and
    wherein the second wireless test communication is transmitted at a second wireless power transmit level from the primary wireless access point.

4. The method as in claim 3, wherein the first wireless transmit power level is greater than the second wireless transmit power level.

5. The method as in claim 2, wherein the feedback includes first feedback, the first feedback indicating a wireless power level at which a first wireless access point of the multiple wireless access points receives the first wireless test communication transmitted from the primary wireless access point; and
    wherein the feedback includes second feedback, the second feedback indicating a wireless power level at which a second wireless access point of the multiple wireless access points receives the first wireless test communication transmitted from the primary wireless access point.

6. The method as in claim 1, wherein each of the multiple test communications is transmitted at a successively lower wireless transmit power level from the primary wireless access point.

7. The method as in claim 1, wherein adjusting the transmit power level of the primary wireless access point based on the feedback includes:
    to reduce an amount of wireless interference caused by the primary wireless access point to the multiple wireless access points, reducing the transmit power level of subsequent communications transmitted from the primary wireless access point to mobile communication devices in communication with the primary wireless access point.

8. The method as in claim 7, wherein adjusting the transmit power level of the primary wireless access point based on the feedback includes:
    maintaining the transmit power level of the primary wireless access point to be above a minimum threshold value needed to communicate from the primary wireless access point to the multiple mobile communication devices.

9. The method as in claim 1, wherein each of the multiple test communications indicate a power level at which the primary wireless access point transmits a respective test communication.

10. The method as in claim 1, wherein the notification indicates an identity of the primary wireless access point transmitting the multiple test communications.

11. The method as in claim 1, wherein the notification specifies a future schedule of times in which the primary wireless access point is scheduled to transmit each of the multiple test communications.

12. The method as in claim 1 further comprising:
monitoring messages received at the primary wireless access point from the multiple wireless access points to identify a degree to which wireless access points in the network environment experience wireless interference caused by transmission of communications from the primary wireless access point.

13. The method as in claim 1 further comprising:
receiving feedback from multiple communication devices in wireless communication with the primary wireless access point; and
utilizing a combination of the feedback from the multiple communication devices and the feedback from the multiple wireless access points to control the transmit power level of the primary wireless access point to communicate with the multiple communication devices.

14. The method as in claim 1, wherein the multiple test communications include a first wireless test communication and a second wireless test communication transmitted from the primary wireless access point;
wherein the feedback includes first feedback, the first feedback indicating a wireless power level at which a first wireless access point of the multiple wireless access points receives the first wireless test communication transmitted from the primary wireless access point; and
wherein the feedback includes second feedback, the second feedback indicating a wireless power level at which a second wireless access point of the multiple wireless access points receives the first wireless test communication transmitted from the primary wireless access point.

15. The method as in claim 1, wherein adjusting the transmit power level of the primary wireless access point based on the feedback includes:
maintaining the transmit power level of the primary wireless access point to be above a minimum threshold value needed to communicate from the primary wireless access point to a corresponding mobile communication device in wireless communication with the primary wireless access point.

16. The method as in claim 1, wherein the primary wireless access point transmits the notification in a first wireless communication communicated from the primary wireless access point to the multiple wireless access points; and
wherein the multiple test communications include a second wireless communication from the primary wireless access point to the mobile communication devices.

17. The method as in claim 1, wherein the notification indicates a specific start time in which the multiple wireless access points are scheduled to monitor reception of the multiple test communications.

18. The method as in claim 1, wherein each of the multiple test communications includes time information.

19. The method as in claim 1, wherein the notification indicates timing in which the primary wireless access point is scheduled to transmit the multiple test communications.

20. A method comprising:
via a communication management resource operative to control multiple wireless access points:
receiving first metrics indicating an amount of wireless interference caused by a primary wireless access point to each of the multiple wireless access points in a network environment;
receiving second metrics indicating a wireless link quality provided by the primary wireless access point to corresponding mobile communication devices in the network environment; and
controlling a wireless transmit power level of the primary wireless access point to the corresponding mobile communication devices based on the first metrics and the second metrics;
wherein controlling the wireless transmit power level of the primary wireless access point includes: in accordance with the first metrics, reducing the wireless transmit power level of the primary wireless access point to decrease the amount of wireless interference caused by the primary wireless access point to each of multiple wireless access points in the network environment.

21. The method as in claim 20, wherein the first metrics indicate a degree to which communications from the primary wireless access point interfere with each of the multiple wireless access points.

22. The method as in claim 20, wherein the decreased wireless transmit power level is above a minimum wireless power threshold value required to support communications between the primary wireless access point and the corresponding mobile communication devices.

23. A system comprising:
multiple wireless access points, each of the multiple wireless access points notified of a wireless power transmit test; and
a primary wireless access point, the primary wireless access point operable to:
in accordance with the wireless power transmit test, transmit multiple test communications at different wireless power levels from the primary wireless access point; and
adjust a transmit power level of the primary wireless access point based on feedback generated by the multiple wireless access points for the wireless power transmit test, the feedback indicating wireless power levels at which the multiple wireless access points receive the test multiple communications at the different wireless power levels from the primary wireless access point during the wireless power transmit test.

24. The system as in claim 23, wherein the primary wireless access point is further operative to:
at a first scheduled time as specified by the wireless power transmit test, transmit a first wireless test communication from the primary wireless access point to the multiple wireless access points; and
at a second scheduled time specified by the wireless power transmit test, transmit a second wireless test communication from the primary wireless access point to the multiple wireless access points.

25. The system as in claim 24, wherein the first wireless test communication is transmitted at a first wireless power transmit level from the primary wireless access point; and
wherein the second wireless test communication is transmitted at a second wireless power transmit level from the primary wireless access point.

26. The system as in claim 25, wherein the first wireless transmit power level is greater than the second wireless transmit power level.

27. The system as in claim 23, wherein each of the multiple test communications is transmitted at a successively lower wireless transmit power level from the primary wireless access point.

28. The system as in claim 23, wherein the primary wireless access point is further operative to:
reduce an amount of wireless interference caused by the primary wireless access point to the multiple wireless access points, reduce the transmit power level of subsequent communications transmitted from the primary wireless access point to mobile communication devices in communication with the primary wireless access point.

29. The system as in claim 28, wherein the primary wireless access point is further operative to:
maintain the transmit power level of the primary wireless access point to be above a minimum threshold value needed to communicate from the primary wireless access point to the mobile communication devices.

30. The system as in claim 23, wherein each of the multiple test communications indicate a power level at which the primary wireless access point transmits a respective test communication.

31. The system as in claim 23, wherein the wireless power transmit test indicates an identity of the primary wireless access point transmitting the multiple test communications.

32. The system as in claim 23, wherein the wireless power transmit test specifies a future schedule of times in which the primary wireless access point is scheduled to transmit each of the multiple test communications.

33. The system as in claim 23, wherein the primary wireless access point is further operative to:
monitor messages received at the primary wireless access point from the multiple wireless access points to identify which wireless access points in the network environment experience wireless interference caused by transmission of communications from the primary wireless access point.

34. The system as in claim 23, wherein the primary wireless access point is further operative to:
receive feedback from multiple communication devices in wireless communication with the primary wireless access point; and
utilize a combination of the feedback from the multiple communication devices and the feedback generated by the multiple wireless access points to adjust the transmit power level of the primary wireless access point to communicate with the multiple communication devices.

35. Computer-readable storage hardware having instructions stored thereon, the instructions, when carried out by computer processor hardware, cause the computer processor hardware to:
communicate a notification from a primary wireless access point to multiple wireless access points in a network environment, the notification indicating a wireless power transmit test;
in accordance with the wireless power transmit test, transmit multiple test communications at different wireless power levels from the primary wireless access point to the multiple wireless access points; and
adjust a transmit power level of the primary wireless access point based on feedback generated by the multiple wireless access points, the feedback indicating wireless power levels at which the multiple wireless access points receive the test communications at different power levels from the primary wireless access point during the wireless power transmit test.

* * * * *

UNITED STATES PATENT AND TRADEMARK OFFICE
CERTIFICATE OF CORRECTION

PATENT NO. : 10,736,051 B2  
APPLICATION NO. : 16/133348  
DATED : August 4, 2020  
INVENTOR(S) : Taren G. McCullough, Matthew J. Dillon and Christopher W. Watson Page 1 of 1

It is certified that error appears in the above-identified patent and that said Letters Patent is hereby corrected as shown below:

In the Claims

Column 24, Line 56, in Claim 23, delete the word "test" and insert after the word "multiple" --test--

Signed and Sealed this
Twenty-second Day of September, 2020

Andrei Iancu
*Director of the United States Patent and Trademark Office*